United States Patent [19]

Mogamiya

[11] Patent Number: 5,510,937
[45] Date of Patent: Apr. 23, 1996

[54] APPARATUS FOR ADJUSTING INTERMESHING ANGLE IN FEED SCREW MECHANISM

[75] Inventor: Makoto Mogamiya, Tokyo, Japan

[73] Assignee: Asahi Kogaku Kogyo Kabushiki Kaisha, Tokyo, Japan

[21] Appl. No.: 165,849

[22] Filed: Dec. 14, 1993

[30] Foreign Application Priority Data

Dec. 14, 1992 [JP] Japan .................................. 4-333260
Dec. 14, 1992 [JP] Japan .................................. 4-333261
Dec. 14, 1992 [JP] Japan .................................. 4-333262

[51] Int. Cl.⁶ .................................................. G02B 7/02
[52] U.S. Cl. ...................... 359/823; 359/829; 359/694; 359/822; 360/78.02; 74/424.8 R
[58] Field of Search .................................. 359/822, 823, 359/829, 694, 695, 696, 873; 360/105, 106, 109, 78.02; 369/215; 74/89.15, 424.8 A, 424.8 R

[56] References Cited

U.S. PATENT DOCUMENTS

| | | | |
|---|---|---|---|
| 4,041,793 | 8/1977 | Repay et al. | 74/424.8 R |
| 4,333,116 | 6/1982 | Schoette et al. | 360/78.02 |
| 4,528,607 | 7/1985 | Thompson | 360/106 |
| 4,667,524 | 5/1987 | Kozawa et al. | 74/89.15 |
| 5,150,260 | 9/1992 | Chigira | 359/694 |
| 5,198,946 | 3/1993 | Kurosawa | 360/105 |
| 5,377,048 | 12/1994 | Tada et al. | 359/823 |

*Primary Examiner*—Loha Ben
*Attorney, Agent, or Firm*—Greenblum & Bernstein

[57] ABSTRACT

An apparatus for adjusting an intermeshing angle of a pin and feed screw in a mechanism in which rotational movement of a feed screw is converted to a linear movement of the pin. The apparatus includes at least one pin which is in mesh with the feed screw, and a linearly movable member which supports the pin and which moves in the axial direction of the feed screw. The linearly movable member includes an adjusting mechanism for adjusting the intermeshing angle of the pin and feed screw.

20 Claims, 20 Drawing Sheets

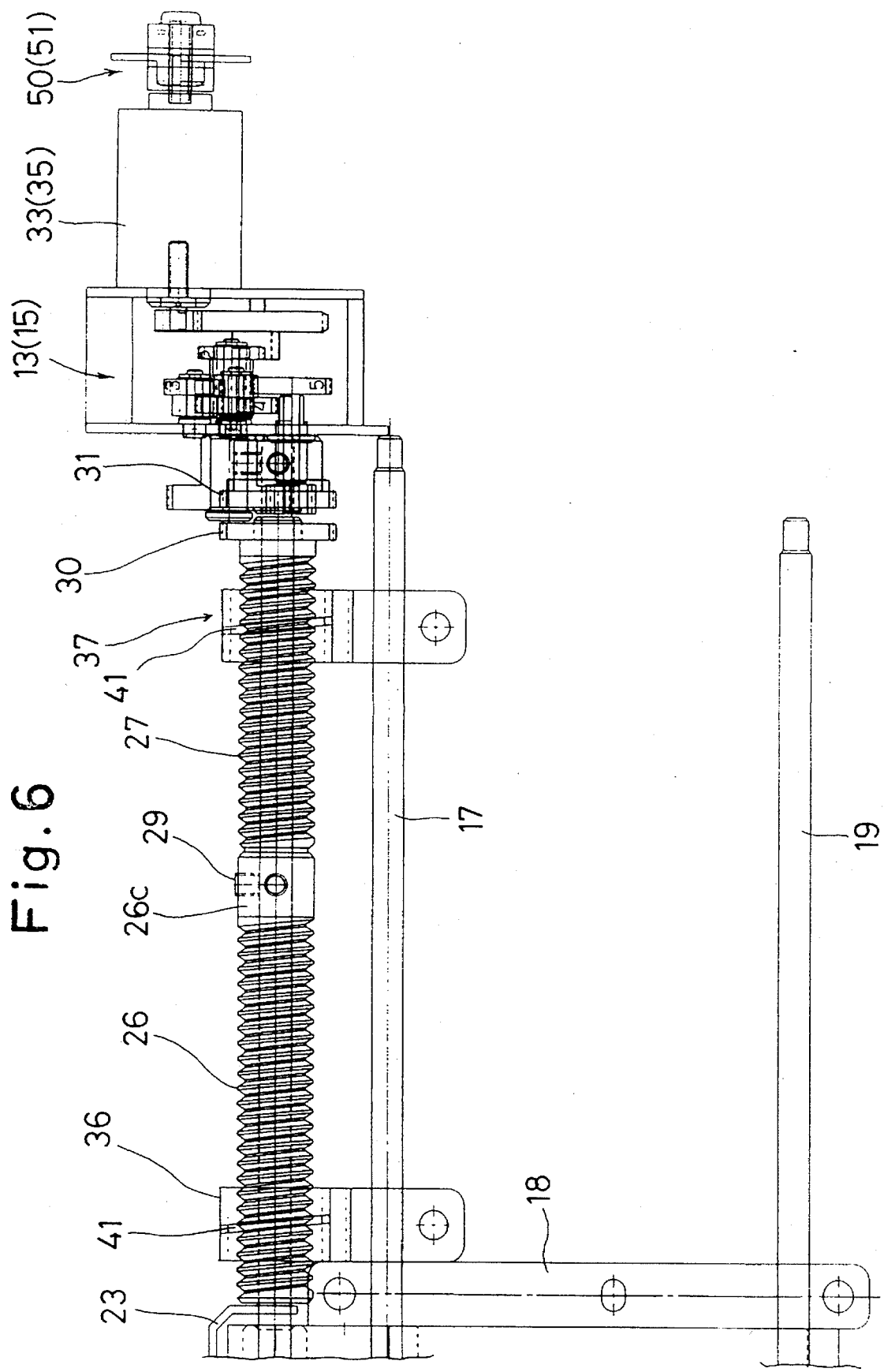

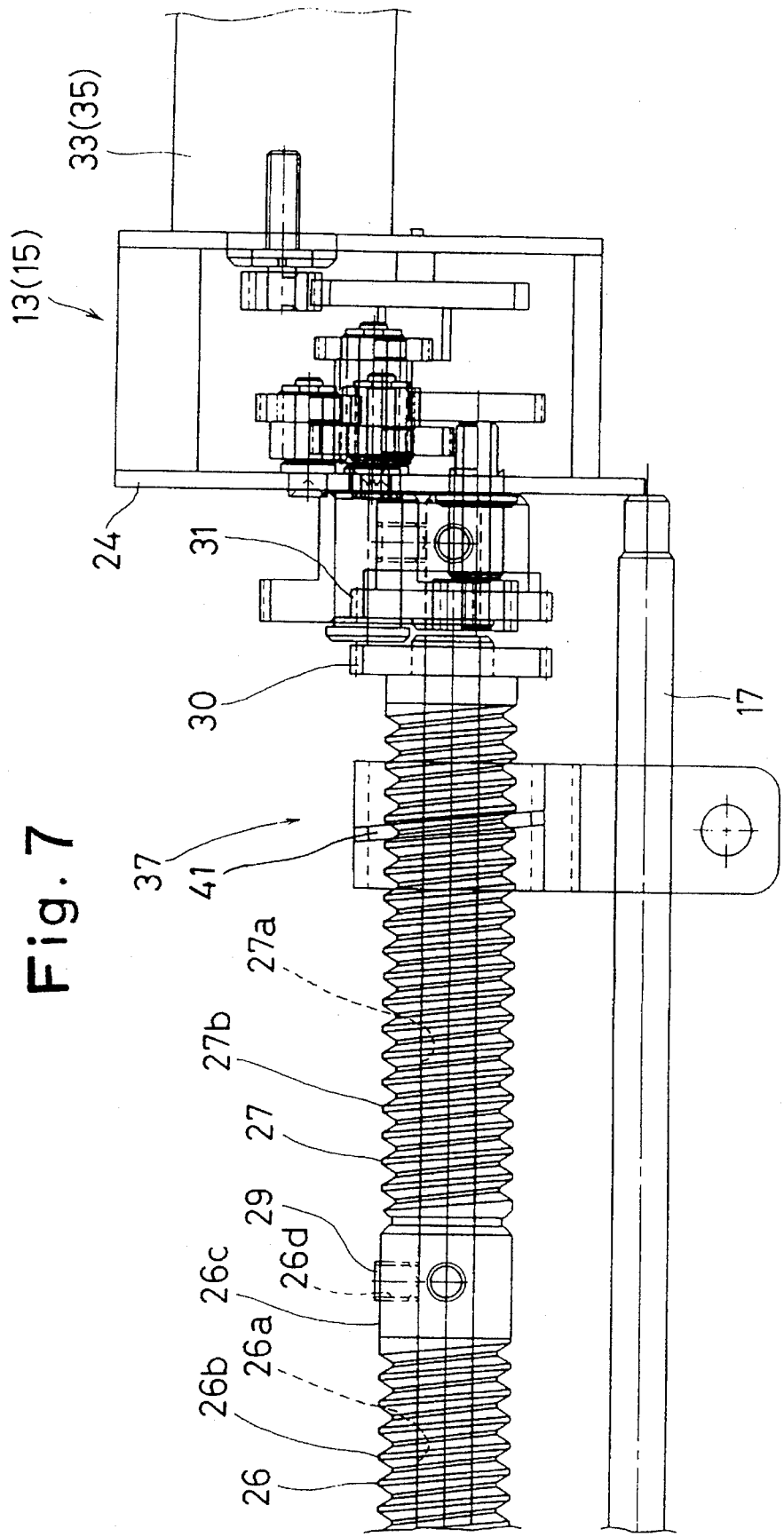

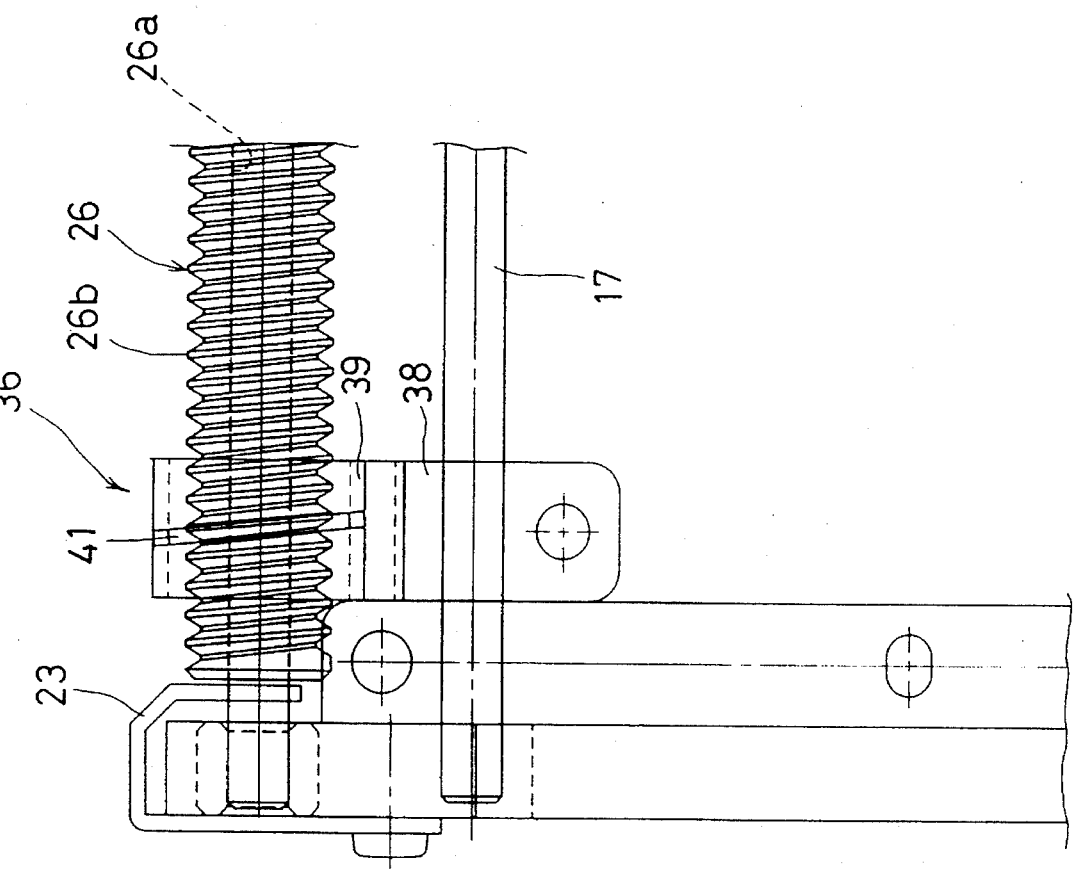

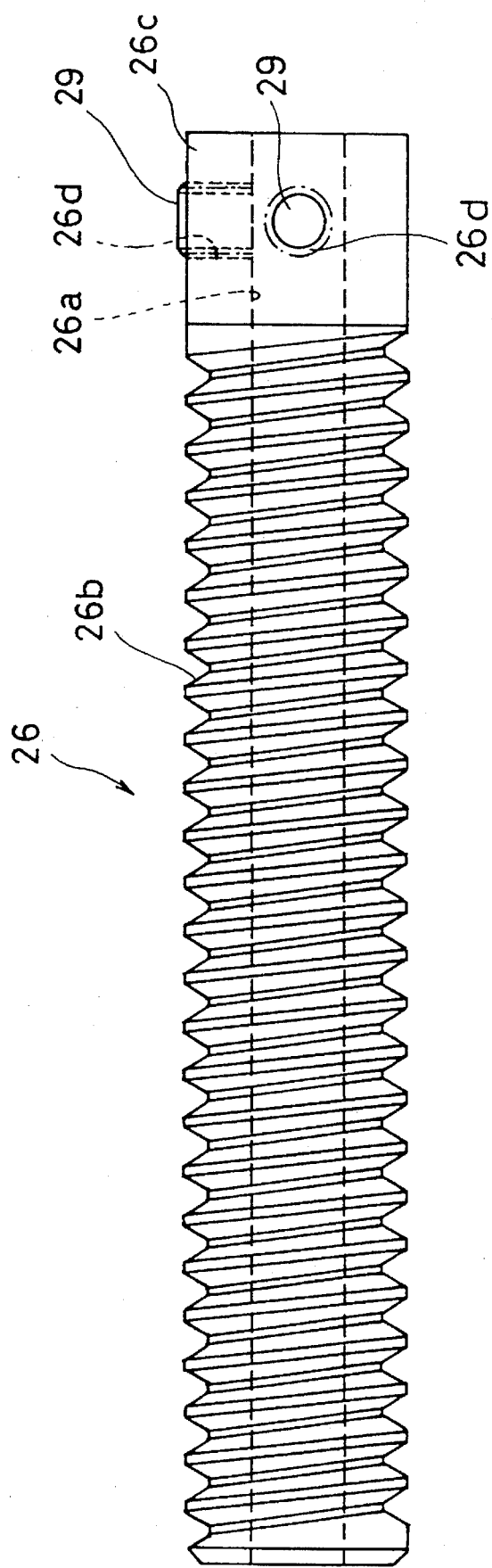

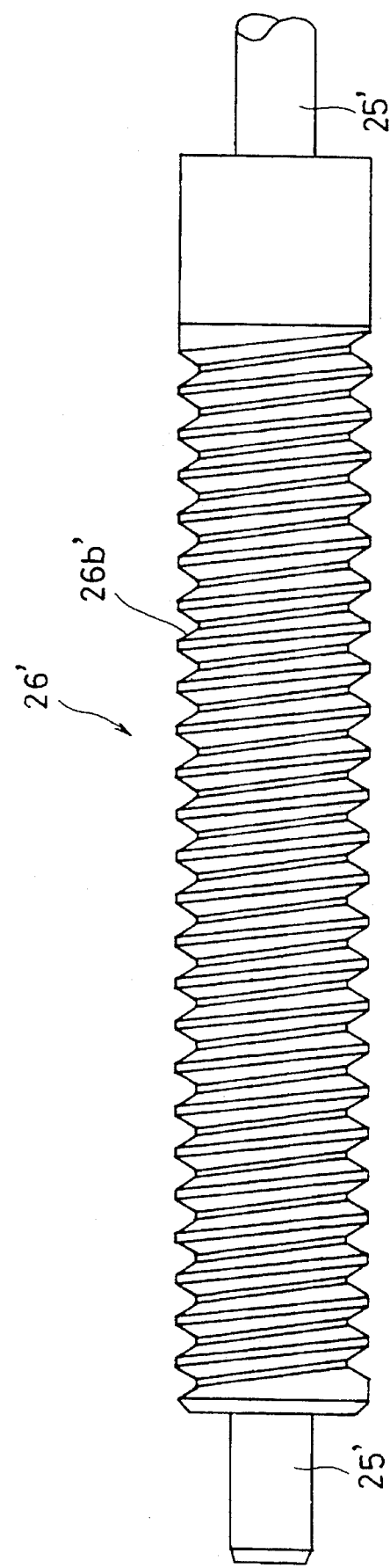

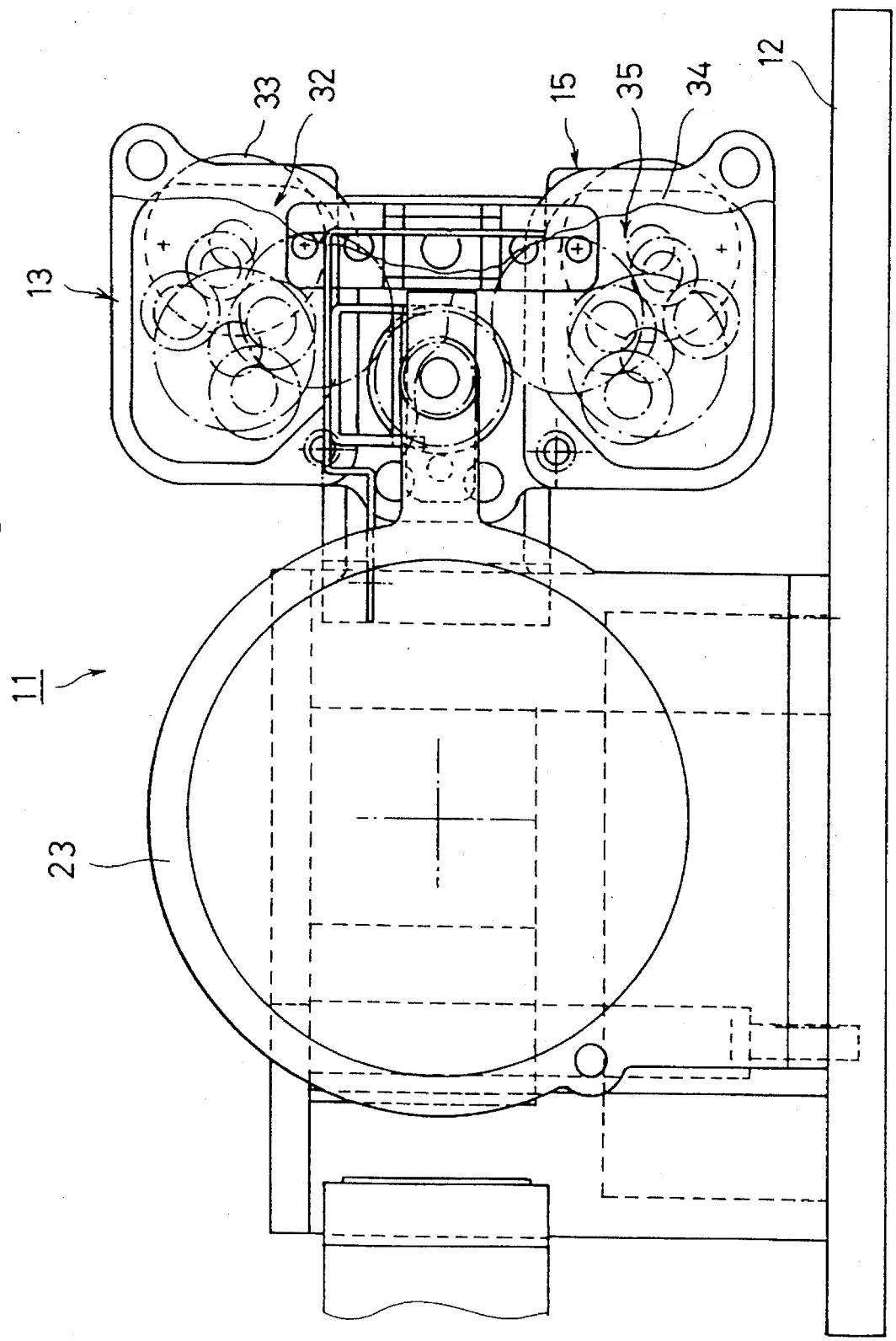

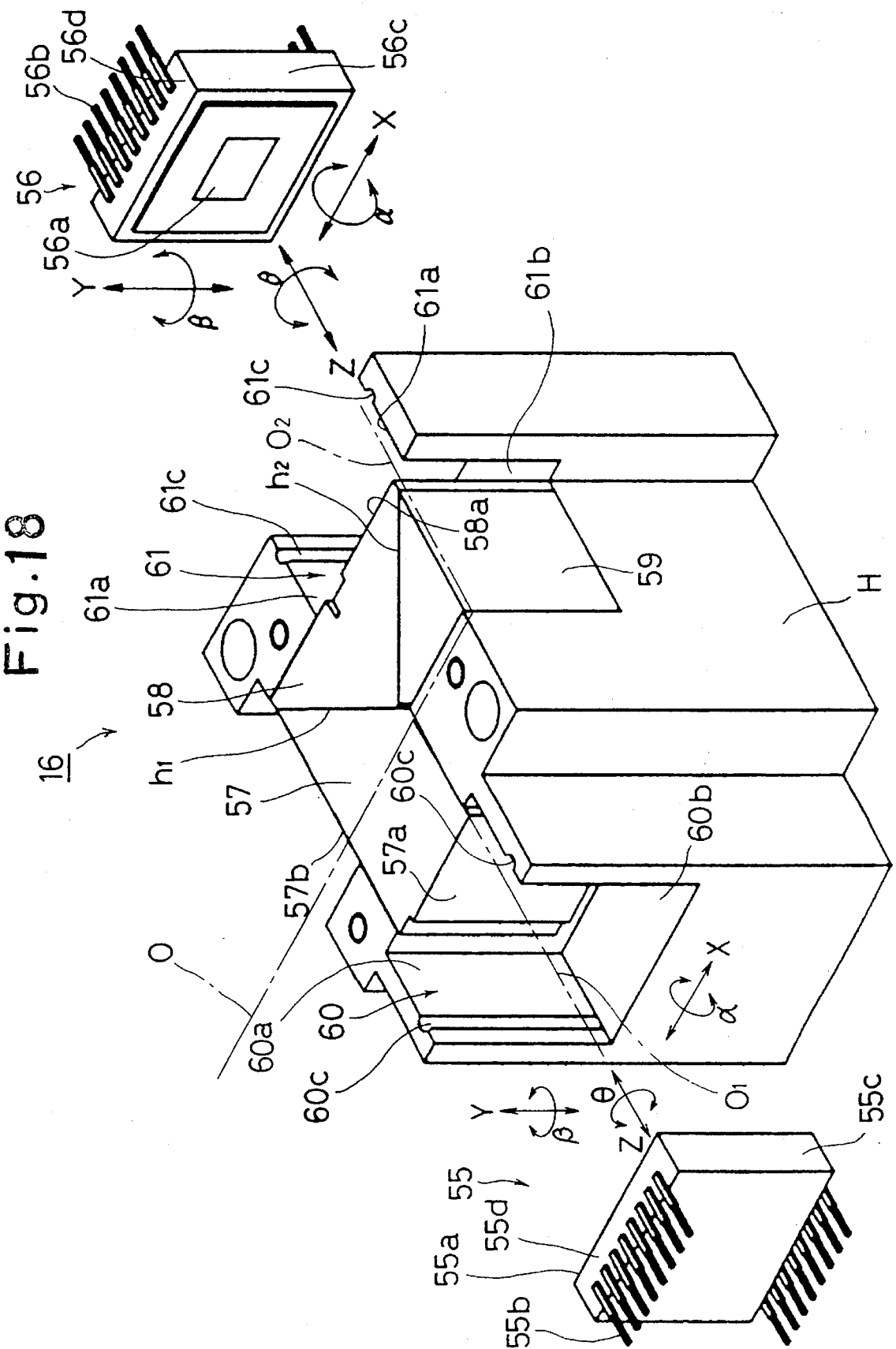

5,510,937

APPARATUS FOR ADJUSTING INTERMESHING ANGLE IN FEED SCREW MECHANISM

BACKGROUND OF THE INVENTION

1. Field of the Invention

The present invention relates to an apparatus for adjusting an intermeshing angle (i.e., operating pressure angle or contact angle) in a feed screw mechanism in which rotational movement of a feed screw is transmitted to a pin which is in mesh with the feed screw, so that a linear movement of the pin (i.e., needle, rod or bar) takes place. The present invention also relates to an apparatus which converts the rotational movement of a lead screw to a linear movement so as to move at least one pair of lens assemblies in an optical axis direction thereof. Moreover, the present invention relates to a securing apparatus which secures an image pickup device at a predetermined position.

2. Description of Related Art

In a conventional optical apparatus such as a camera, a feed screw mechanism has been used to convert the rotational movement of a feed (i.e., lead) screw to a linear movement through, for example, a pin which meshes with the feed screw to move a lens assembly or lens assemblies in an optical axis direction. For example, the pin is connected to the lens assemblies of the camera so that the lens assemblies can be moved in the optical axis direction by the rotational movement of the feed screw to carry out a predetermined operation, such as a zooming, etc.

In such a known feed screw mechanism, if the pin does not mesh with the feed screw at an optimal angle, a deviation of the intermeshing position between the needle and the feed screw, from a predetermined position, might occur, resulting in an incorrect axial movement of the lens assemblies.

Furthermore, in the conventional feed screw mechanism, there are two separate feed screws for driving one of a pair of lens assemblies and the other lens assembly, respectively. However, the provision of the separate drivers (i.e., feed screws) for the various components of the associated optical device (camera, etc.) increases the number of necessary components and complicates the structure of the device.

Furthermore, there are known multistage video cameras, electronic still cameras or image scanners, etc., in which a plurality of CCD type or MOS type solid-state image sensors are used, for example, to enhance the resolution. In such cameras, light transmitted through a taking lens is split or separated by a prism, so that the split beams can be received by the respective image sensors. In order to recombine the images detected by the respective image sensors, it is necessary to effect a fine adjustment of the relative position of the image sensors to thereby precisely superimpose the images. In the fine adjustment, one of the image sensors (i.e., first image sensor) is first positioned. Then, the position adjustment of the second image sensor is carried out in accordance with the image detected by the first image sensor, so as to precisely superimpose the first and second images. The same operations are successively carried out for the remaining image sensors.

The position adjustment of the image sensors, as discussed above, is however very complex and requires a complicate adjusting mechanism. Up until now, a simple securing mechanism of an image sensor (or image sensors) which can easily execute the position adjustment has not been provided.

SUMMARY OF THE INVENTION

The primary object of the present invention is to provide an apparatus for adjusting an intermeshing angle of a feed screw mechanism in which the intermeshing angle of the pin with respect to the lead angle of the feed screw(s) can be easily adjusted.

Another object of the present invention is to provide a simple drive apparatus of a camera using a minimum number of components.

It is yet another object of the present invention to provide a simple securing and adjusting apparatus of image sensors.

According to the present invention, an apparatus is provided for adjusting an intermeshing angle of a pin and feed screw in a mechanism in which rotational movement of a feed screw is converted to a linear movement of the pin. The apparatus includes at least one pin which is in mesh with the feed screw, and a linearly movable member which supports the pin and which moves in the axial direction of the feed screw. The linearly movable member includes an adjusting mechanism for adjusting the intermeshing angle of the pin and the feed screw.

According to another aspect of the present invention, a lens driving apparatus is provided in which rotational movement of a feed screw is converted to linear movement of at least one pair of lens assemblies in an optical axis direction. The apparatus includes a pair of feed screw shafts which are independently rotatable and which lie in (i.e., along) the same line, and a pair of driving mechanisms for independently driving the respective feed screw shafts.

According to still another aspect of the present invention, an image sensor holding apparatus, which holds at least one image pickup device at a predetermined position, is provided. The apparatus includes holding surfaces which hold therebetween outer side surfaces of the image pickup device, and guide grooves provided on the holding surfaces in which an adhesive can be introduced along the outer side surfaces of the image pickup device.

The present disclosure relates to subject matter contained in Japanese patent application Nos. HEI4-333260, HEI4-333261 and HEI4-333262 (all filed on Dec. 14, 1992) which are expressly incorporated herein by reference in their entirety.

BRIEF DESCRIPTION OF THE DRAWINGS

The invention will be described below in detail with reference to the accompanying drawings, in which;

FIG. 6 is a plan view of an electronic camera system, as shown in FIG. 1, with the optical system removed;

FIG. 7 is an enlarged front elevational view of a main part of a feed screw mechanism and a drive mechanism of an electronic camera according to the present invention;

FIG. 8 is an enlarged front elevational view of a main part of a feed screw mechanism of an electronic camera system according to the present invention;

FIGS. 9A and 9B are front elevational views of embodiments of feed screw shafts according to the present invention;

FIG. 10 is a side elevational view of a main part of an electronic camera according to the present invention, viewed from the direction A in FIG. 1;

FIG. 18 is a perspective view of an intermeshing angle adjusting apparatus before an image sensor is incorporated therein, according to the present invention;

DESCRIPTION OF THE PREFERRED EMBODIMENT

Figure 1:
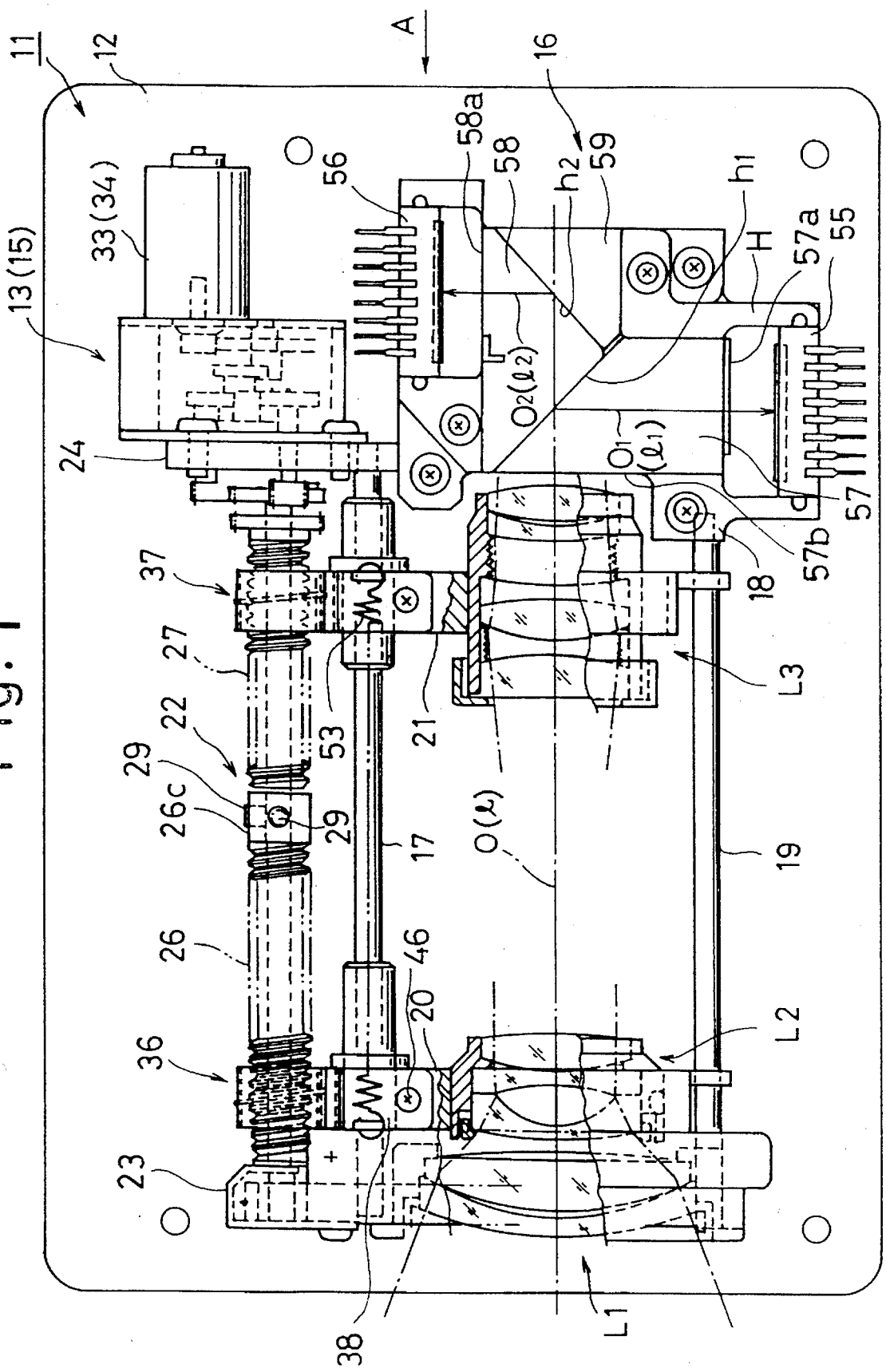
FIG. 1 is a plan view of an entire electronic camera system to which the present invention is applied.
Figure 2:
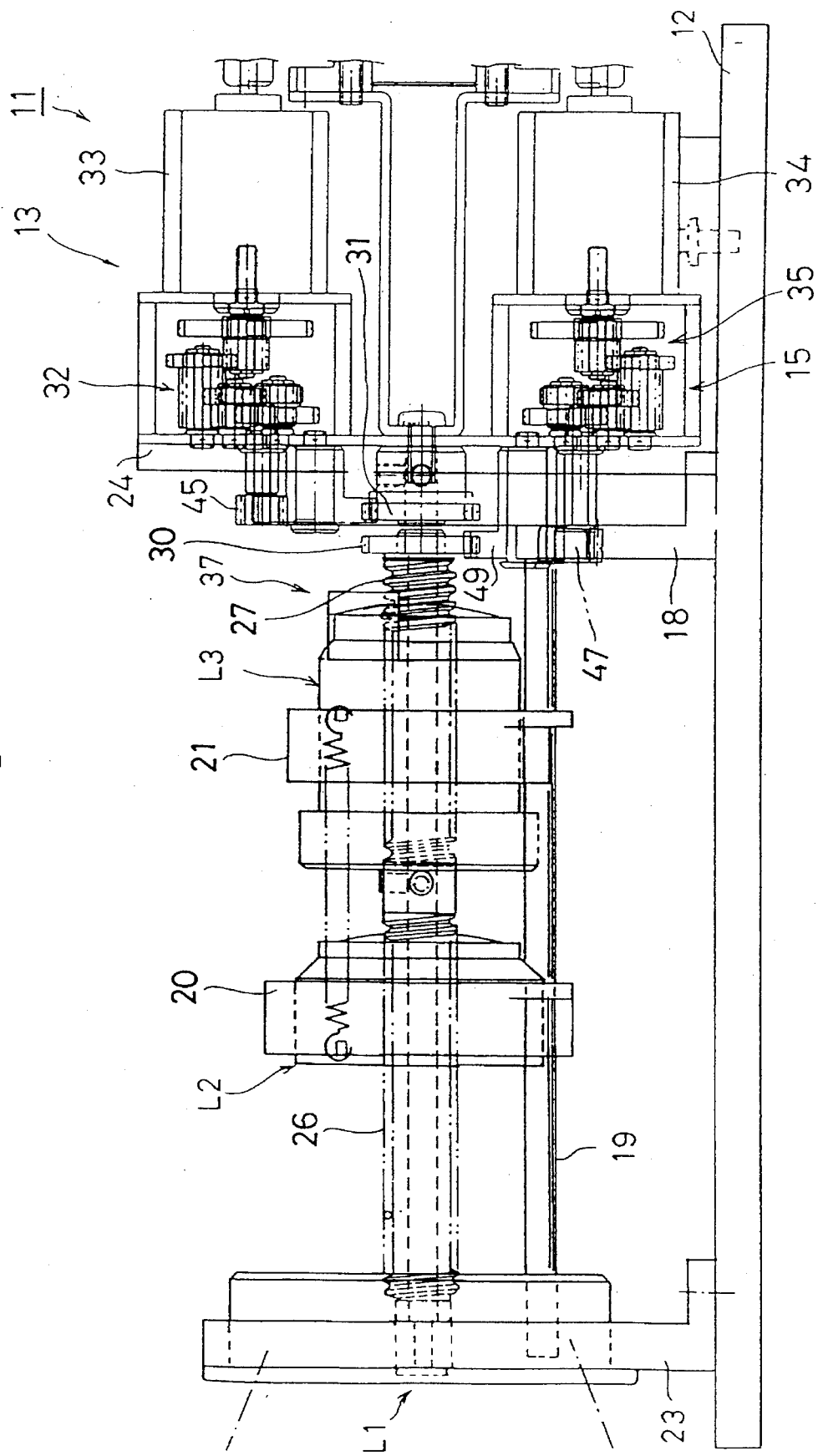
FIG. 2 is a side elevational view of an entire electronic camera system shown in FIG. 1.
Figure 3:
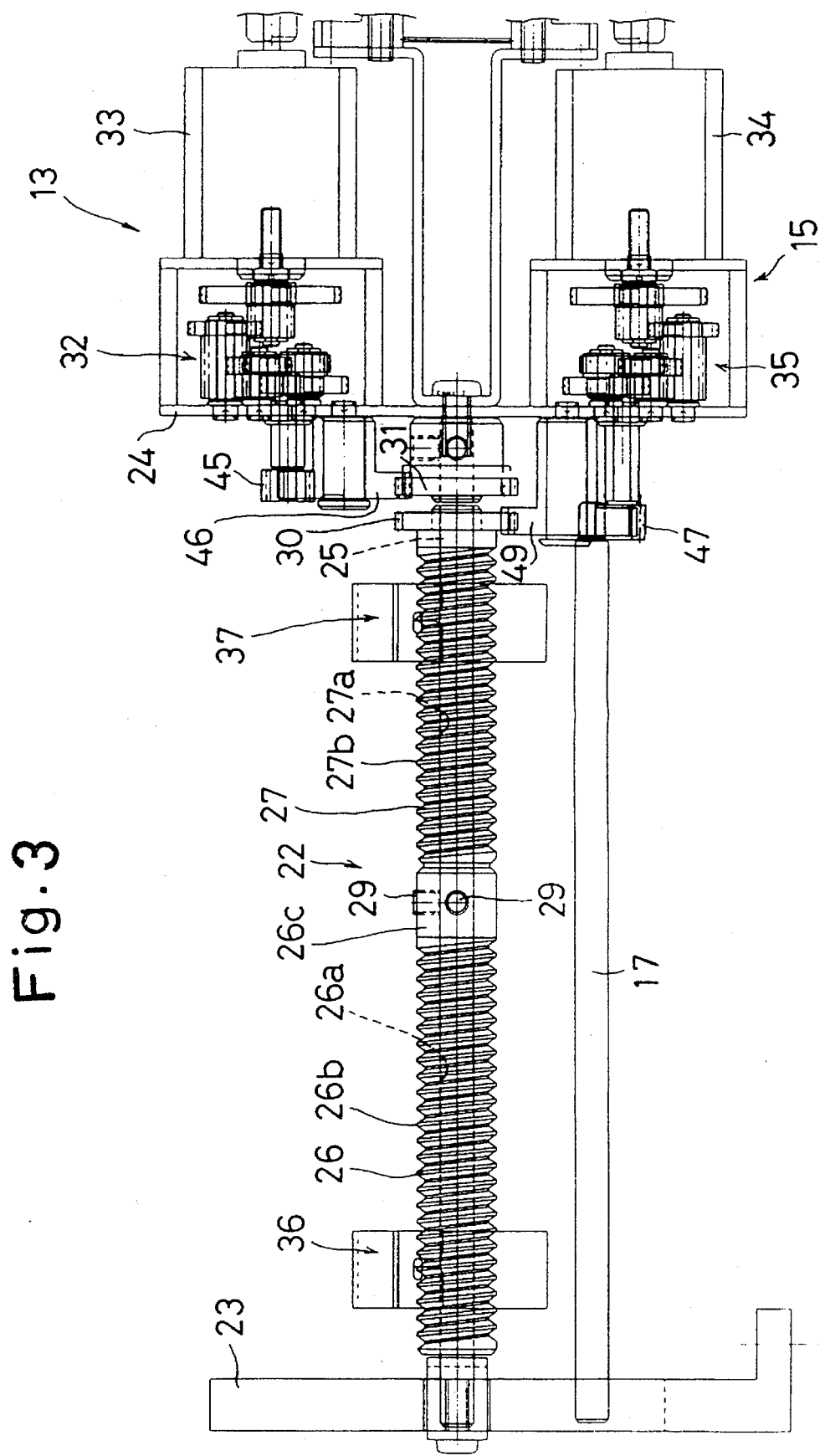
FIG. 3 is a front elevational view of a feed screw mechanism of an electronic camera system shown as in FIG. 1, with the optical system removed.
Figure 4:
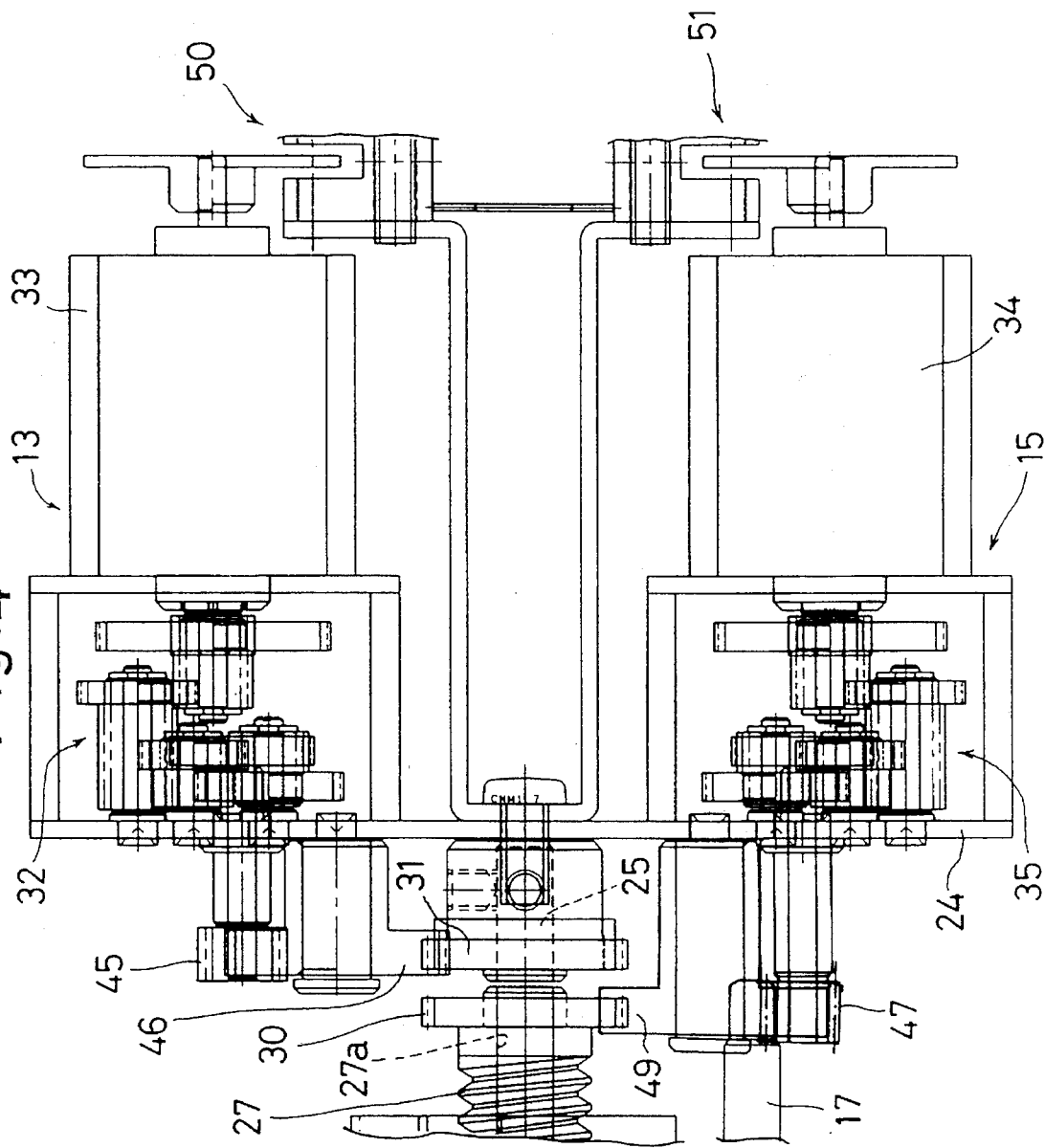
FIG. 4 is an enlarged front elevational view of a main part of a drive mechanism of an electronic camera system according to the present invention.
Figure 5:
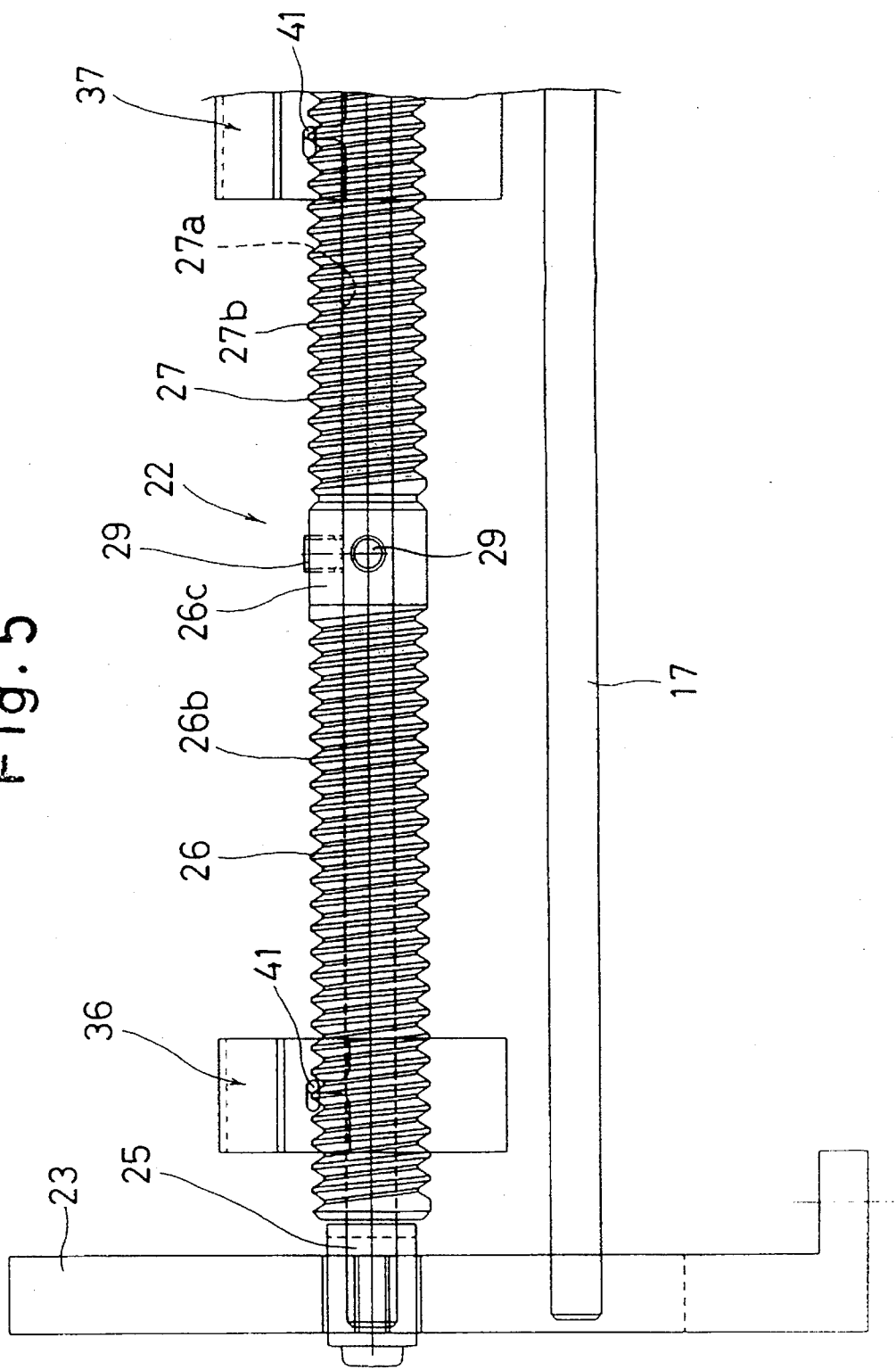
FIG. 5 is an enlarged front elevational view of a main part of a feed screw mechanism of an electronic camera system according to the present invention.
Figure 11:
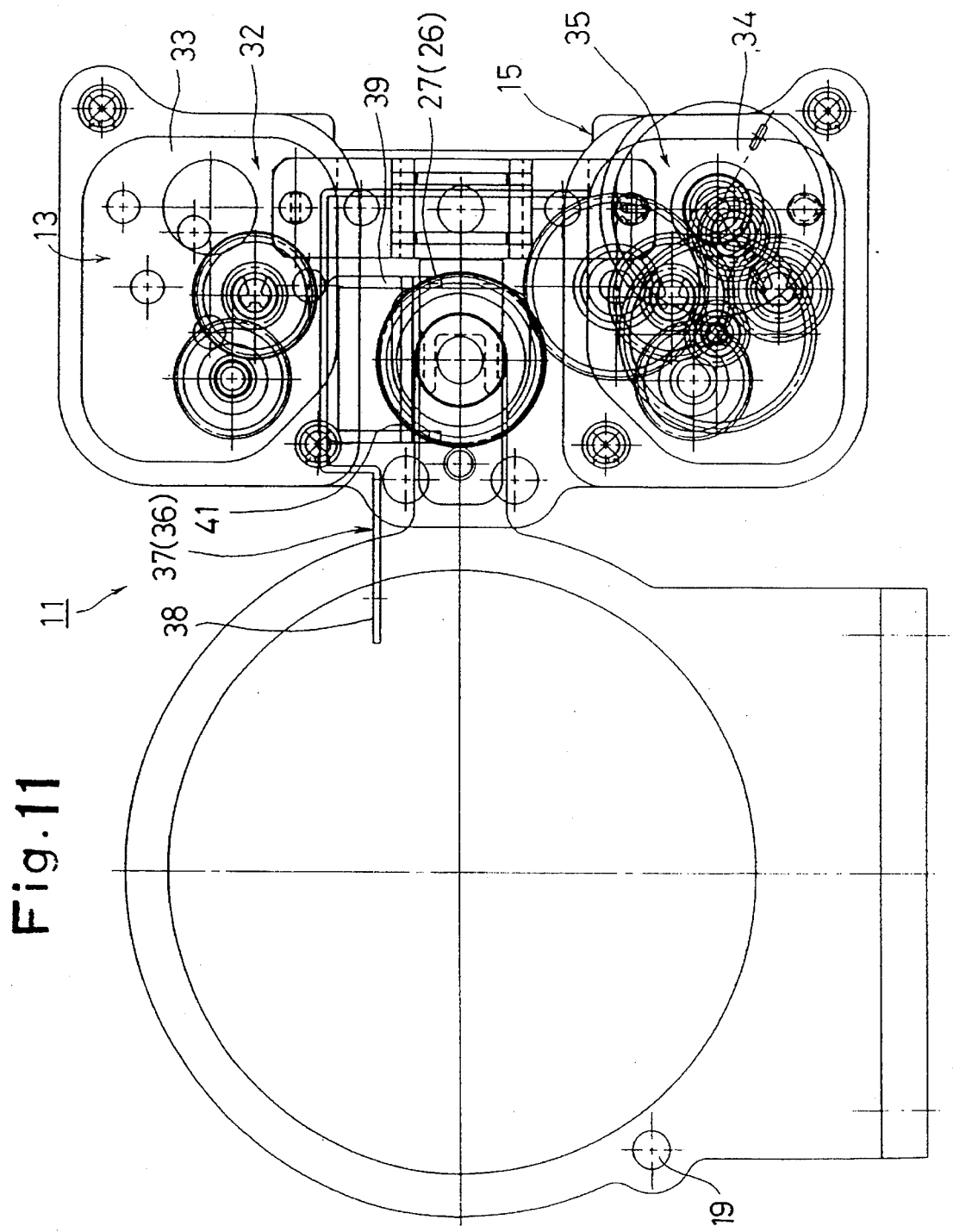
FIG. 11 is an enlarged view of a main part of an electronic camera according to the present invention, viewed from the direction A in FIG. 1.
Figure 12:
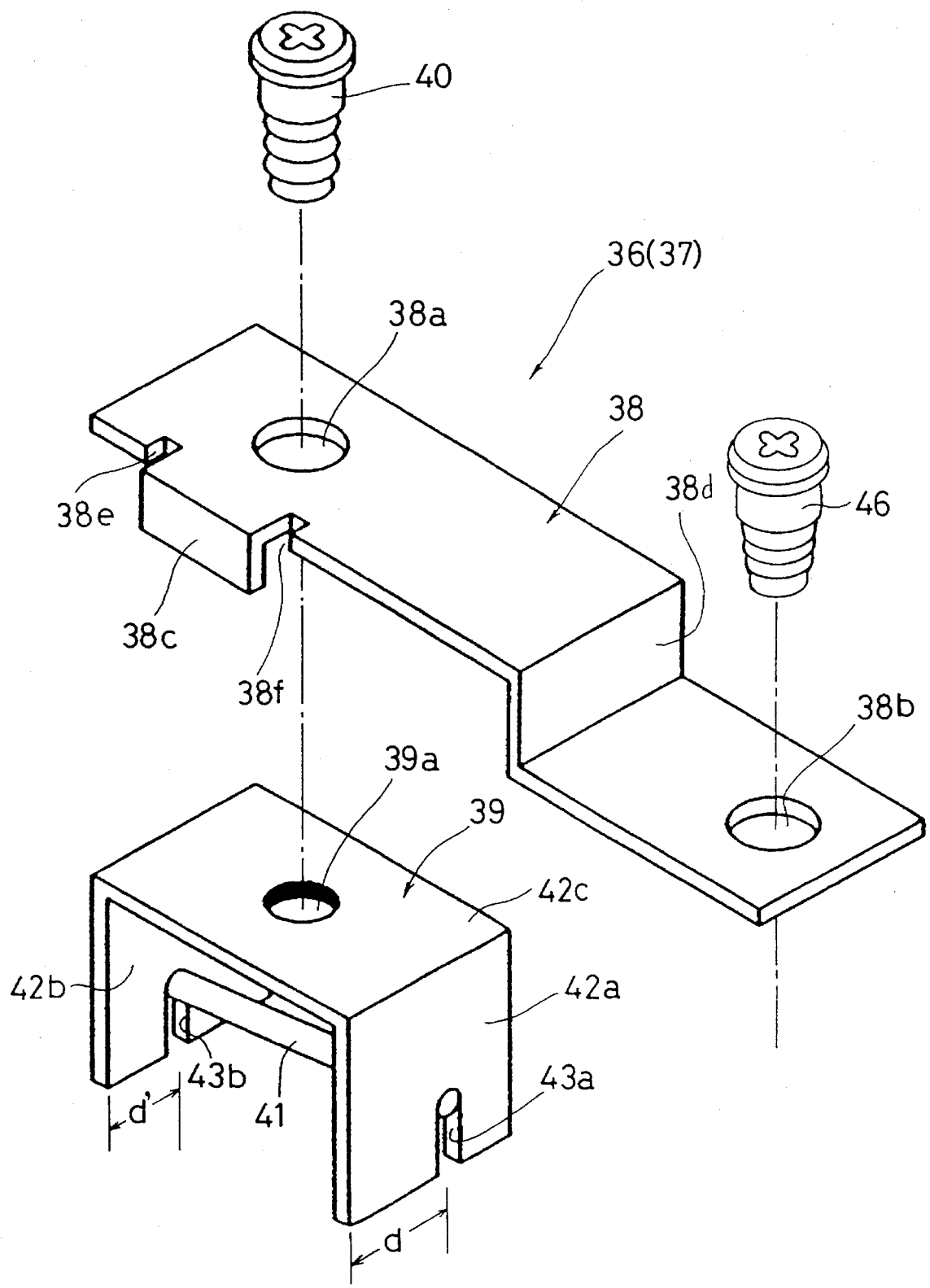
FIG. 12 is an exploded perspective view of an intermeshing angle adjusting apparatus according to the present invention.
Figure 13:
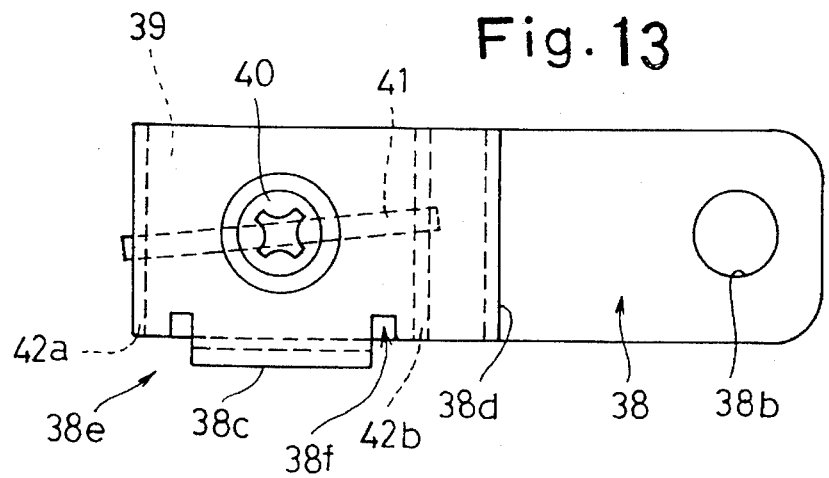
FIG. 13 is a plan view of an intermeshing angle adjusting apparatus according to the present invention.
Figure 14:
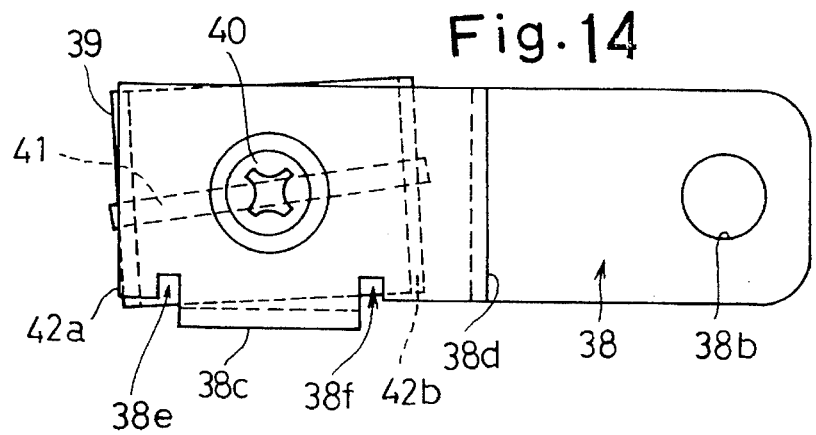
FIG. 14 is a plan view of an intermeshing angle adjusting apparatus according to the present invention, shown in a position in which a pin securing member is rotated with respect to a supporting plate.

FIGS. 1 and 2 show a plan view and a side elevational view of an internal structure of an electronic camera 11 to which the present invention is applied, respectively. The electronic camera 11 includes a CCD image sensor and a photographing lens which is in the form of a zoom lens, provided on a substrate 12. An external cover (not shown) is provided to isolate at least the optical path of the photographing optical system from external light.

The electronic camera 11 includes three groups of lenses, i.e., a first lens assembly L1, a second lens assembly L2 and a third lens assembly L3. The first lens assembly L1 is secured to a supporting member 23 which is in turn secured to the substrate 11. The second and third lens assemblies L2 and L3 are movable in the optical axis direction. The second and third lens assemblies L2 and L3 are moved towards and away from each other in the optical axis direction, in accordance with a predetermined relation, to carry out the zooming operation. The second lens assembly L2 is moved in the optical axis direction to carry out the focusing operation after the zooming operation is completed.

A second lens assembly driving unit 13 and a third lens assembly driving unit 15 are provided behind the third lens assembly L3 to move the second lens assembly L2 and the third lens assembly L3 in the optical axis direction.

A prism portion 16 is provided behind the third lens assembly L3 for splitting beams of light transmitted through the first, second and third lens assemblies L1, L2 and L3. The bundle of rays transmitted through the first, second and third lens assemblies L1, L2 and L3 is made incident upon the prism portion 16 and split thereby to be received by the first and second CCD image sensors 55 and 56, respectively. Note that "O" designates the optical axis of the photographing lens.

Two guide bars 17 and 19, spaced at a predetermined distance, are provided away from the optical path of the first, second and third lens assemblies L1, L2 and L3 and extending in parallel with the optical axis O. The guide bars 17 and 19 are secured at the front ends thereof to the supporting member 23 and at the rear ends thereof to a drive unit mounting plate 24 and a supporting plate 18, secured to the substrate 12, respectively.

A second lens assembly supporting member 20 (i.e., second lens support) and a third lens assembly supporting member 21 (i.e., third lens support) are supported by the guide bars 17 and 19 to move in the optical axis direction. The second lens support 20 and the third lens support 21 support the second and third lens assemblies L2 and L3 and move in the optical axis direction.

The following discussion will be addressed to a feed screw mechanism which converts the rotational movement of a feed screw 22 to a linear movement of the second and third lens assemblies L2 and L3 through a pin 41. The linear movement is effected in the optical axis direction. The feed screw mechanism includes a feed screw 22 which extends parallel to the guide bars 17 and 19 on the side of the guide bar 17 opposite the optical axis O. The feed screw 22 is fitted in linearly movable members 36 and 37 which are movable in the optical axis direction and which are provided with pins 41. The pins 41 are in mesh with the feed screw 22. The linearly movable members 36 and 37 are respectively secured to the second and third supports 20 and 21 to move the second and third lens assemblies L2 and L3 in the optical axis direction. The linearly movable members 36 and 37 are biased towards each other by a coil spring 53 provided therebetween.

The feed screw 22 is provided with a core shaft 25 and a pair of first and second hollow screw shafts 26 and 27 which are rotatably fitted with the core shaft 25. The core shaft 25 is rotatably supported by the supporting member 23 and the drive unit mounting plate 24 at the front and rear ends thereof. The screw shafts 26 and 27 are provided with threaded portions (i.e., male screws) 26b and 27b which are in mesh with the pins 41, so that when the screw shafts 26 and 27 are rotated, the pins 41 and, accordingly, the second and third lens assemblies L2 and L3 are linearly moved in the optical axis direction.

A drive gear 31 is secured to the core shaft 25 near the drive unit mounting plate 24.

The first screw shaft 26 is provided with the male screw 26b and a securing portion (i.e., chuck) 26c having no threaded portion. The securing portion 26c is provided with a threaded hole (or threaded holes) 26d which extends in a direction perpendicular to the axis of the screw shaft, as can be seen in FIG. 9A. A machine screw (or machine screws) 29 is screwed in the threaded hole 26d. The first screw shaft 26 is secured to the core shaft 25 by pressing the machine screw 29 against the core shaft 25 at the front end of the machine screw 29 which projects from the threaded hole 26d towards the core shaft 25. Preferably, there are a plurality of threaded holes 26d which are spaced at an equiangular distance, and a plurality of machine screws 29 engaged in the corresponding threaded holes 26d.

The second screw shaft 27 is provided with the male screw 27b and a drive gear 30 secured to the rear end thereof. The second screw shaft 27 is rotatable with respect to the core shaft 25 and abuts against the head (i.e., chuck) 26c of the first screw shaft 26 at the front end thereof to restrict the axial movement of the second screw shaft. Namely, the first screw shaft 26 is secured to the core shaft 25 so as to rotate together, and the second screw shaft 27 is supported by the core shaft 25 to rotate with respect thereto. Consequently, the first and second screw shafts 26 and 27 are independently rotatable.

Note that since the second screw shaft 27 is continuously biased towards the first screw shaft 26 by the coil spring 53 provided between the linearly movable members 36 and 37, as mentioned above, the second screw shaft 27 is held so that the front end of the second screw shaft 27 is pressed against the head 26c of the first screw shaft 26.

The second lens assembly driving unit 13 and the third lens assembly driving unit 15 are provided on the drive unit mounting plate 24 in a symmetrical arrangement with respect to the feed screw 22. The second lens assembly driving unit 13 is comprised of a reduction gear train 32 and a first drive motor 33 which rotates the reduction gear train 35. The third lens assembly driving unit 15 is comprised of a reduction gear train 35 and a second drive motor 34 which rotates the reduction gear train 35. The reduction gear train 32 is functionally connected to a drive gear 31 through a pinion 45 and a transmission gear 46. Pinion 45 and transmission gear 46 are secured to respective shafts extending forwardly from the drive unit mounting plate 24 in the optical axis direction. The reduction gear train 35 is functionally connected to a drive gear 30 through a pinion 47 and a transmission gear 49. Pinion 47 and transmission gear 49 are secured to respective shafts extending forward from the drive unit mounting plate 24 in the optical axis direction.

The first and second drive motor 33 and 34 are provided, on the rear ends of the respective drive shafts thereof, with rotation detecting sensors 50 and 51 which detect the number of revolution and the rotational states of the respective drive shafts. The first and second drive motor 33 and 34 are controlled in accordance with the output values of the corresponding detecting sensors. In the illustrated embodiment, both detecting sensors 50 and 51 include a slit disc which is secured to a rotation shaft and which has a plurality of slits circumferentially spaced by equiangular distances, and a photo-coupler having a pair of photo-coupler elements provided on opposite sides of the slit disc in the optical path to output pulse signals every time the slits intercept the optical path. The detecting sensors 50 and 51 also include a counter which counts signals output from the photo-coupler in accordance with the rotation of the drive motor 33 or 34. The counter counts up or down depending on the direction of rotation of the drive motor 33 or 34. In the illustrated embodiment, the positions of the second and third lens assemblies L2 and L3 are detected in accordance with the counter values of the detecting sensors 50 and 51, with reference to reference positions defined by initial positions (i.e., one of the extremities) of the second and third lens assemblies L2 and L3.

The adjusting apparatus of the intermeshing angle (i.e., operating pressure angle or contact angle), according to the present invention, will be described below in further detail with reference to FIGS. 12 through 17.

The adjusting apparatus adjusts the intermeshing angle of the pins 41 with respect to the respective screw shafts 26 and 27 of the feed screw mechanism. In the illustrated embodiment, the adjustment is equally applied to both the linearly movable members 36 and 37 for the second lens assembly L2 and the third lens assembly L3. Accordingly, the following discussion will be directed only to the linearly movable members 36 for the second lens assembly L2.

The adjusting apparatus for the linearly movable member 36 includes a supporting plate 38 and a pin securing member 39 to which one pin 41 is secured. The pin securing member 39 is supported by the supporting plate 38 so that the angle of the pin 41, with respect to the male screw 26b of the first screw shaft 26, can be adjusted. The pin securing member 39 can be secured to the supporting plate 38 after the adjustment is completed.

The supporting plate 38 is in the form of a crank (i.e., stepped plate) having a center connecting portion 38d. One of the stepped plate portions of the supporting plate 38 is provided with an insertion hole 38a through which an adjusting screw can be inserted. A rotation restricting portion 38c is integral with the supporting plate 38 and projects downward from the front end of the stepped plate portion. The other stepped plate portion of the supporting plate 38 is provided with a connecting hole 38b through which a machine screw can be inserted to secure the supporting plate 38 to the second linearly movable member 36. The pin securing member 39 is rotatably mounted to the supporting plate 38 through the adjusting screw 40 inserted in the insertion hole 38a. As mentioned above, the supporting plate 38 is secured to the second linearly movable member 36 by the machine screw 46 which is screwed in a threaded hole 36a of the linearly movable member 36 through the connecting hole 38b. The rotation restricting portion 38c restricts the angular movement of the pin securing member 39. Note that numerals 38e and 38f designate recesses in which a tool or jig in the form of a rod can be received to rotate the pin securing member 39 upon adjustment of the intermeshing angle.

The pin securing member 39 is bent into a generally U-shaped form having side plates 42a and 42b and an intermediate portion 42c which is provided with a center hole 39a in which the adjusting screw 40 inserted in the insertion hole 38a of the supporting plate 38 is inserted. The adjusting screw 40 extends through the insertion holes 38a and 39a and is fastened by a nut 45 onto the pin securing member 39, so that the latter and the supporting plate 38 are firmly held together.

The side portions (i.e., bent ends) 42a and 42b of the pin securing member 39 are provided on the front (lower) ends thereof with lower grooves 43a and 43b, in which the pin 41, having a circular cross sectional shape, is fitted. The pin 41 can be secured in and to the grooves 43a and 43b by the elasticity of the bent ends 42a and 42b, caulking, or an adhesive, etc. The grooves 43a and 43b are spaced at distances "d" and "d'" from the front edge of the side plates 42a and 42b, respectively. When the intermediate portion 42c is mounted to a predetermined portion 42c of the camera in an initial position in which the front and rear edges of the intermediate portion 42c extend perpendicularly to the optical axis O, the pin 41 forms a predetermined angle, which is substantially identical to the lead angle of the male screw 26b, with respect to the direction normal to the optical axis O.

Figure 15:
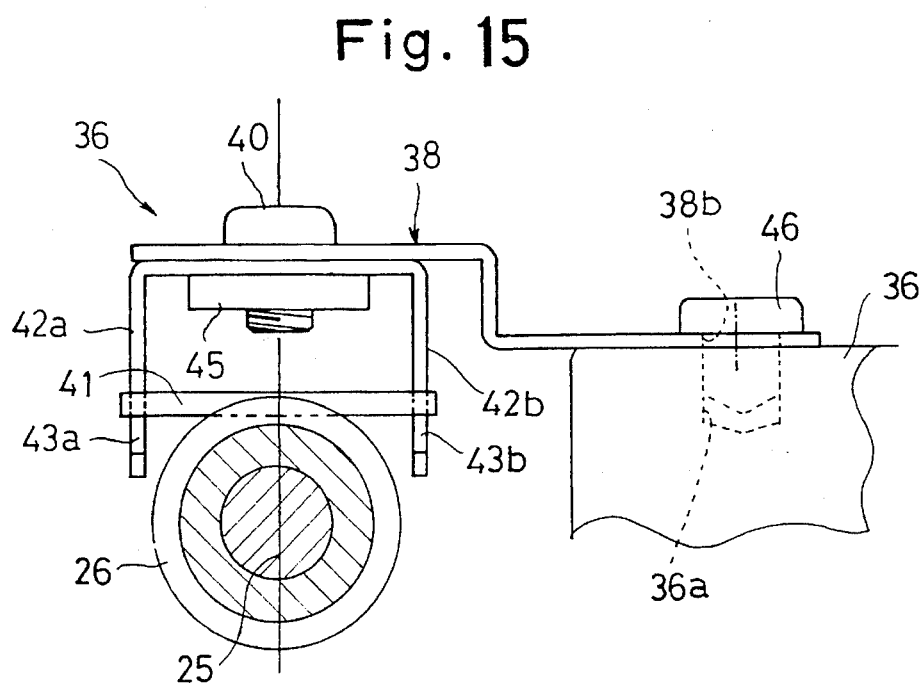
FIG. 15 is a side elevational view of an intermeshing angle adjusting apparatus according to the present invention, viewed from the side of an object to be photographed.

As mentioned above, the pin securing member 39, to which the pin 41 is secured, is connected to the supporting plate 38 by the adjusting screw 40 and the nut 45. The supporting plate 38 is secured to the linearly movable member 36 by the machine screw 46 which is screwed in the threaded hole 36a of the linearly movable member 36 through the connecting hole 38b of the supporting plate 38 (FIG. 15). In this state, the center axis of rotation of the pin 41 passes through the axis of the first screw shaft 26. Accordingly, there is little change in the relative position between the pin 41 and the male screw 26b if the pin 41 rotates. Namely, there is little change in the relative position between the first screw shaft 26 and the supporting plate 38.

Preferably, the pin 41 is made of a rigid material and the supporting plate 38 is made of an elastic or flexible material, so that the pin 41 comes into contact with the male screw 26b with a predetermined pressure when no load is applied. Consequently, the supporting plate 38 biases the pin 41 against the male screw 26b in the direction perpendicular to the axis of the screw shaft 26 (i.e., the axial direction of the adjusting screw 40). It is also possible to make the pin 41 of elastically deformable or flexible plastic or metals, etc. In particular, if the pin 41 is made of an elastic material, there is little distortion. Accordingly, the positional deviation of the screw shaft 26 and the supporting plate 38 can be minimized. Alternatively, it is possible to make these components of a rigid material.

The camera apparatus 11 as constructed above operates as follows.

When an operational switch (not shown) is actuated by a photographer to effect the zooming operation, the first and second drive motors 33 and 34 are driven through the drive circuit. The rotation of the first drive motor 33 is reduced by the reduction gear train 32 and transmitted to the drive gear 31 through the pinion 45 and the transmission gear 46, so that the first screw shaft 26, secured to the core shaft 25, is rotated through the core shaft 25. As a result, the second movable member 36 is linearly moved forward or backward in accordance with the lead of the first screw shaft 26, which is in mesh with the pin 41. The movement of the second lens assembly L2, by a displacement corresponding to the number of revolutions of the first drive motor 33, occurs in the direction corresponding to the direction of rotation of the first drive motor 33.

The rotation of the second drive motor 34 is reduced by the reduction gear unit 35 and transmitted to the drive gear 30 through the pinion 47 and the transmission gear 49, so that the second screw shaft 27, to which the drive gear 30 is secured, is rotated. As a result of the rotation of the second screw shaft 27, the linearly movable member 37, having the pin 41 which is in mesh with the screw shaft 27, is linearly moved forward or backward in accordance with the lead of the screw shaft 27, which is in mesh with the pin 41. Namely, the movement of the third lens assembly L3 by a displacement corresponding to the number of revolutions of the second drive motor 34 occurs in the direction corresponding to the direction of rotation of the second drive motor 34.

Thus, the movement of the second and third lens assemblies L2 and L3, in the optical axis direction, takes place while a predetermined relationship therebetween is maintained to execute the zooming operation. In the zooming operation, both the second and third lens assemblies L2 and L3 are moved simultaneously (i.e., parallel to each other) in the optical axis direction with a predetermined relationship by simultaneously driving the first and second drive motors 33 and 34, or one of the first and second drive motors 33 and 34 is first driven through a predetermined angular displacement prior to the movement of the other motor (i.e., motor 34 or 33), so that the second and third lens assemblies L2 and L3 are successively moved.

In the camera apparatus 11, according to the present invention, the first drive motor 33 is driven for a predetermined time upon completion of the zooming operation, so that the second lens assembly L2 is moved in the optical axis direction by the rotation of the first screw 26 to effect the focusing operation. Note that if the focusing data is obtained during the zooming operation, it is possible to move the second lens assembly L2 in the optical axis direction by a displacement which is identical to a value corresponding to the total displacement minus the displacement determined in accordance with the focusing data in order to effect the focusing operation in parallel with the zooming operation.

Figure 17A:
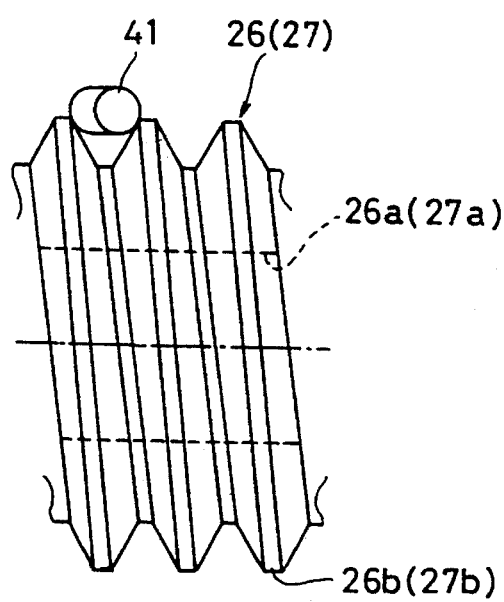
FIGS. 17A and 17B are front elevational view and plan view of a screw shaft and a pin shown in an incorrect intermeshing position, respectively.
Figure 17B:
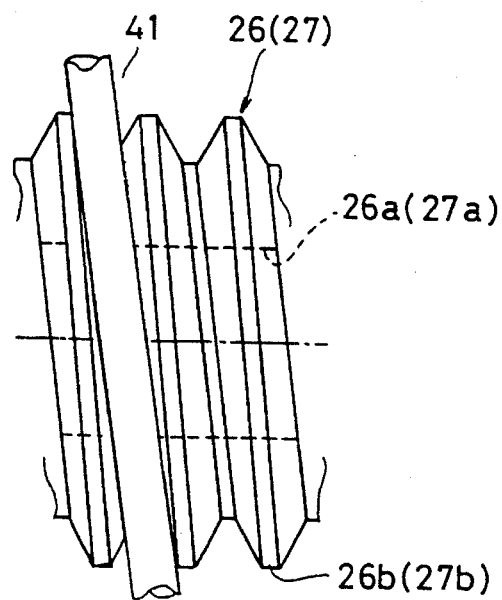
Figure 19:
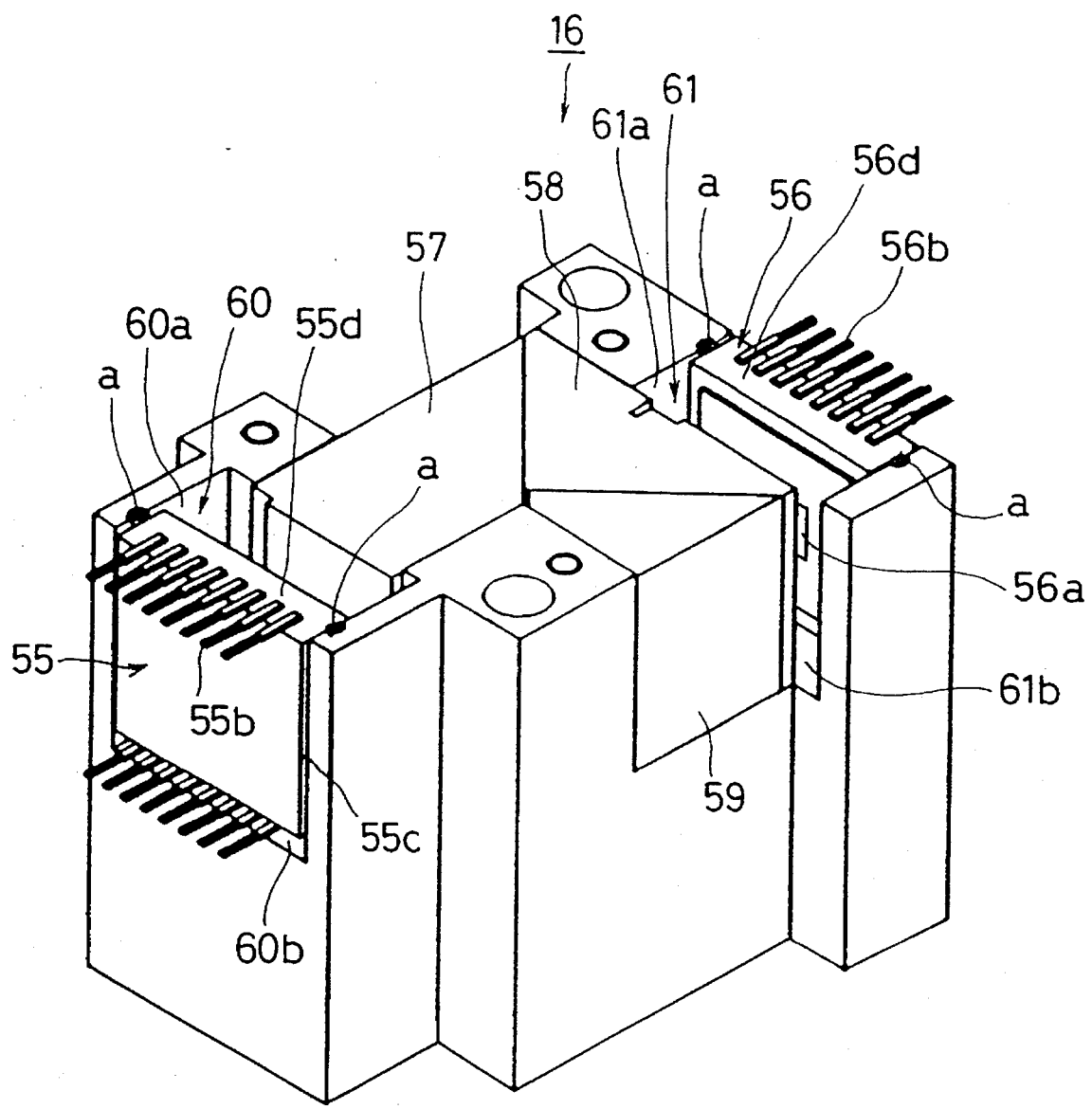
FIG. 19 is a perspective view of an image sensor securing apparatus after a CCD image sensor is incorporated therein, according to the present invention.

If the engaging angle (i.e., intermeshing angle) of the pin 41 with respect to the male screw 26b of the first screw shaft 26 is improper, i.e., if the pin 41 does not properly mesh with spiral groove of the male screw 26b (27b), as shown in FIGS. 17A and 17B, the pin 41 may jump out of (i.e., deviate from) the correct engaging position (i.e., intermeshing position) due to a shock, oscillation, etc. thus resulting in a deviation of the step position (i.e., engaging position) with the first screw shaft 26. Consequently, the number of revolutions of the drive motors 33 and 34 (i.e., the counted values of the rotation detecting sensors 50 and 51) might no longer correspond to the positions of the second and third lens assemblies L2 and L3, thus leading to incorrect zooming or focusing.

To prevent this, according to the illustrated embodiment, the intermeshing angle (i.e., engagement angle) of the pin 41 of the linearly movable member 36 (or 37) and the first screw shaft 26 (or second screw shaft 27) is adjusted as follows.

Figure 16A:
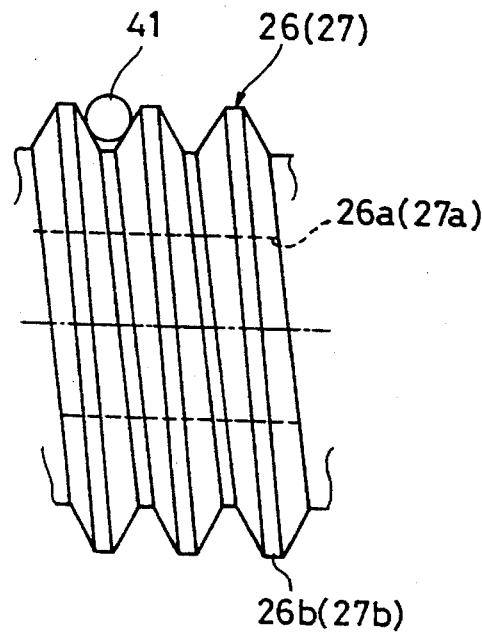
FIGS. 16A and 16B are front elevational view and plan view of a screw shaft and a pin shown in a correct intermeshing position, respectively.
Figure 16B:
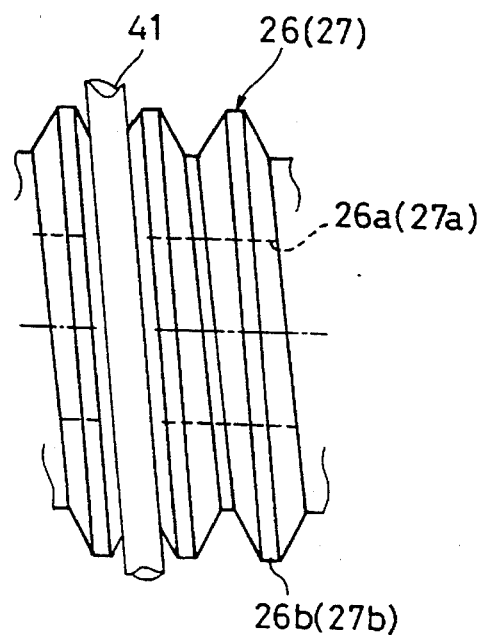

The adjusting screw 40 is loosened so that the pin securing member 39 is rotatable with respect to the supporting plate 38. The pin securing member 39 is rotated by a tool or jig (not shown) fitted in the recess 38f (or 38e) to vary the intermeshing angle of the pin 41 to be identical to the lead angle of the male screw 26b of the first screw shaft 26 (FIGS. 16A and 16B). In this state (i.e., appropriate position), the adjusting screw 40 is fastened to immovably hold the pin securing member 39.

Thus, the intermeshing angle of the pin 41 with the lead angle of the first screw shaft 26 and the intermeshing angle of the pin 41 with the lead angle of the second screw shaft 27 can be properly adjusted to prevent the occurrence of an error of the step position mentioned above, etc.

During the rotation of the adjusting screw 40 to secure the pin securing member 39 to the supporting plate 38, there is a possibility that the pin securing member 39 will be rotated and deviated from the adjusted correct position due to the rotational force acting thereon in the same direction as the adjusting screw 40. This is due to the adjusting screw 40 also serving as a rotational shaft of the pin securing member 39. To prevent this, it is possible to use a stepped screw as the adjusting screw 40, so that the pin securing member 39 can be rotated by a relatively small force with respect to the supporting plate 38. In this alternative, the pin securing member 39 can be adhered to the supporting plate 38 by an adhesive or the like.

The adjustment of the intermeshing angle of the pin 41 and the male screw 26b enables the pin 41 to come into appropriate contact with the tooth surface of the male screw 26b to thereby minimize backlash. Consequently, the smooth forward or backward movement of the second lens assembly L2 (or third lens assembly L3) takes place in accordance with the rotation of the first screw shaft 26 (or second screw shaft 27) without delay.

In the illustrated embodiment, although the same pins 41, etc., are provided for the first screw shaft and the second screw shaft 27, it goes without saying that the pins 41 are not necessarily identical. They are constructed corresponding to the first and second screw shafts.

As can be understood from the above discussion, according to the present invention, since the linearly movable member is comprised of a pin securing member, and a supporting member which supports the pin securing member to rotate in accordance with the lead angle of the feed screw, the intermeshing angle of the pin(s) with respect to the lead angle of the feed screw can be easily adjusted. Consequently, according to the present invention, the drawbacks, that would result when the intermeshing angle of the pin with respect to the lead angle of the screw shaft is improper, can be eliminated.

Furthermore, according to the present invention, in the lens driving apparatus provided in the camera apparatus 11, since the screw shafts 26 and 27, which drive the respective second and third lens assemblies L2 and L3, are hollow and independently rotatable, the single core shaft 25 can be inserted in the hollow portions 26a and 27a of the screw shafts to define the single linear feed screw 22. Accordingly, not only can the screw shafts 26 and 27 be accommodated in a small space, but also, many components can be commonly used to reduce the number of indispensable (i.e. necessary) components of the apparatus. Consequently, the drive apparatus can be simplified, resulting in a compact camera apparatus.

Since the drive gear 31 which drives the first screw shaft 26 is secured to the core shaft 25, and the drive gear 30 which drives the second screw shaft 27 is provided adjacent to the drive gear 31, so that the drive gears 30 and 31 are aligned, the drive force of the drive units 13 and 15, which are provided on the drive unit mounting plate 24, can be easily transmitted through the transmission gears 46 and 49, which are located at different axial positions. Moreover, since the pair of drive units 13 and 15 are provided on the drive unit mounting plate 24 in a symmetrical arrangement with respect to the feed screw 22, space is effectively utilized.

Although the first and second hollow screw shafts 26 and 27 are made of a material separate from that of the core shaft 25 in the illustrated embodiment, it is possible to form the first screw shaft 26' integral with the core shaft 25' which is fitted in the second hollow screw shaft 27 (FIG. 9B).

In the illustrated embodiment, although the feed screw 22 is spaced from the second and third lens assemblies L2 and L3 in parallel therewith, and the second and third lens assemblies L2 and L3 are respectively connected to the feed screw 22 through the second and third lens supports 20 and 21, it is also possible instead to provide the feed screw 22 between the guide bars 17 and 19, so that the second and third lens assemblies L2 and L3 come closer to the feed screw 22 to realizing a more compact structure.

As can be seen from the above discussion, according to the present invention, the feed screw drives the two lens assemblies through a pair of screw shafts which are coaxially aligned and which are independently rotatable. Accordingly, fewer components are necessary. Consequently, a simple driving apparatus of a camera can be obtained.

The following discussion will be addressed to the CCD image sensor securing mechanism according to the present invention, particularly with reference to FIGS. 18 through 23.

Figure 20:
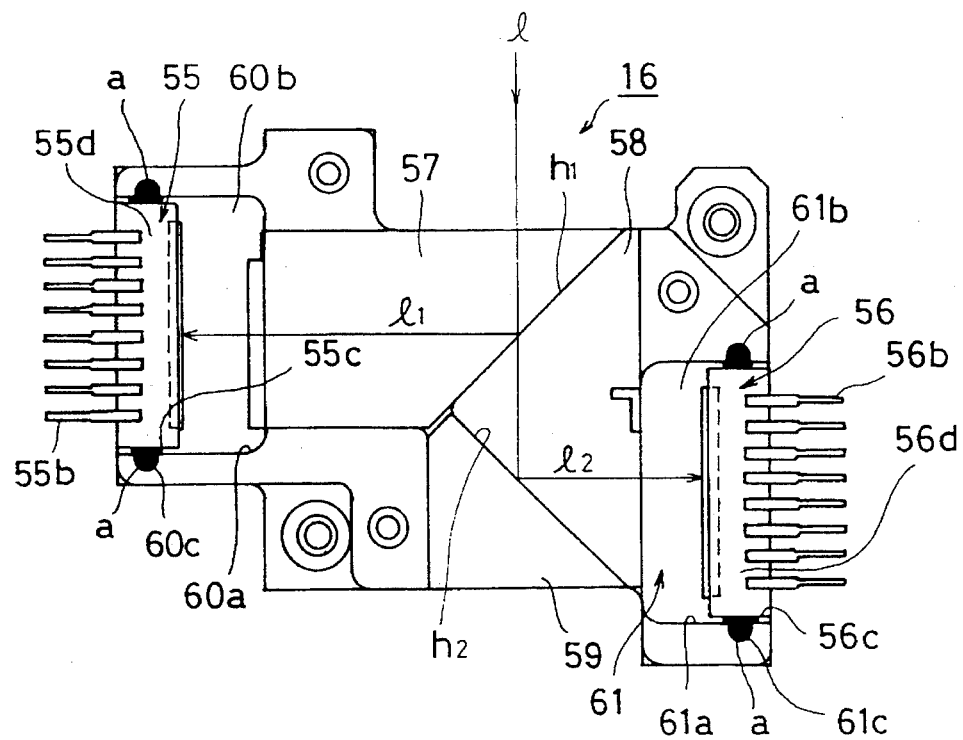
FIG. 20 is a view of an image sensor securing apparatus shown in FIG. 19.

As shown in FIGS. 1 and 20, the prism portion 16, to which the CCD image sensor securing mechanism is applied, includes three prism elements 57, 58 and 59 which are interconnected and connected to the holder H so as to define half mirror surfaces $h_1$ and $h_2$ between the prism elements. The bundle of rays l (i.e., light flux on the optical axis) of an object incident upon the surface 57b of the prism 57 is partly reflected by the first half mirror surface h1 in the lateral direction perpendicular to the optical axis O along the optical axis O, extending parallel to the substrate 12 to form a first bundle of raysl 1, and is emitted from the outgoing surface 57a to be made incident upon the CCD image sensor 55. The remaining bundle of rays of the object is transmitted through the half mirror surface $h_1$ and is reflected by the second reflecting surface $h_2$ along the optical axis $O_2$, extending in the direction opposite to the optical axis $O_1$, to form a second bundle of rays l2 to be made incident upon the CCD image sensor 56.

The holder H holds the prism elements 57, 58 and 59 so that the incident surface 57b and the emitting surface 57a of the first prism element 57 and the emitting surface 58a of the second prism element 58 are exposed. Also, the holder H holds the first and second CCD image sensors 55 and 56 such that the light receiving surfaces 55a and 56a are located at the image forming positions of the first and second split bundles of rays $l_1$ and $l_2$ emitted from the emitting surfaces 57a and 58a.

The first CCD image sensor 55 is secured to the first CCD image sensor securing portion 60 of the holder H after the fine adjustment of the position and direction thereof is effected. Similarly, the second CCD image sensor 56 is secured to the second CCD image sensor securing portion 61 of the holder H after the fine adjustment of the position and direction thereof is effected. The CCD image sensors 55 and 56 are in the form of a parallelepiped having right and left side surfaces 55c and 56c, perpendicular to the light receiving surfaces 55a and 56a, and upper and lower surfaces 55d and 56d normal thereto. As is well known, the upper and lower surfaces 55d and 56d are provided with two rows of terminal pins 55b and 56b which are connected to a pulse outputting circuit which outputs drive pulses, an image processing circuit which processes the optically transformed image signals, etc. In the image processing circuit, the image signals received by the CCD image sensors 55 and 56 are processed, recorded and monitored, if necessary.

Figure 23:
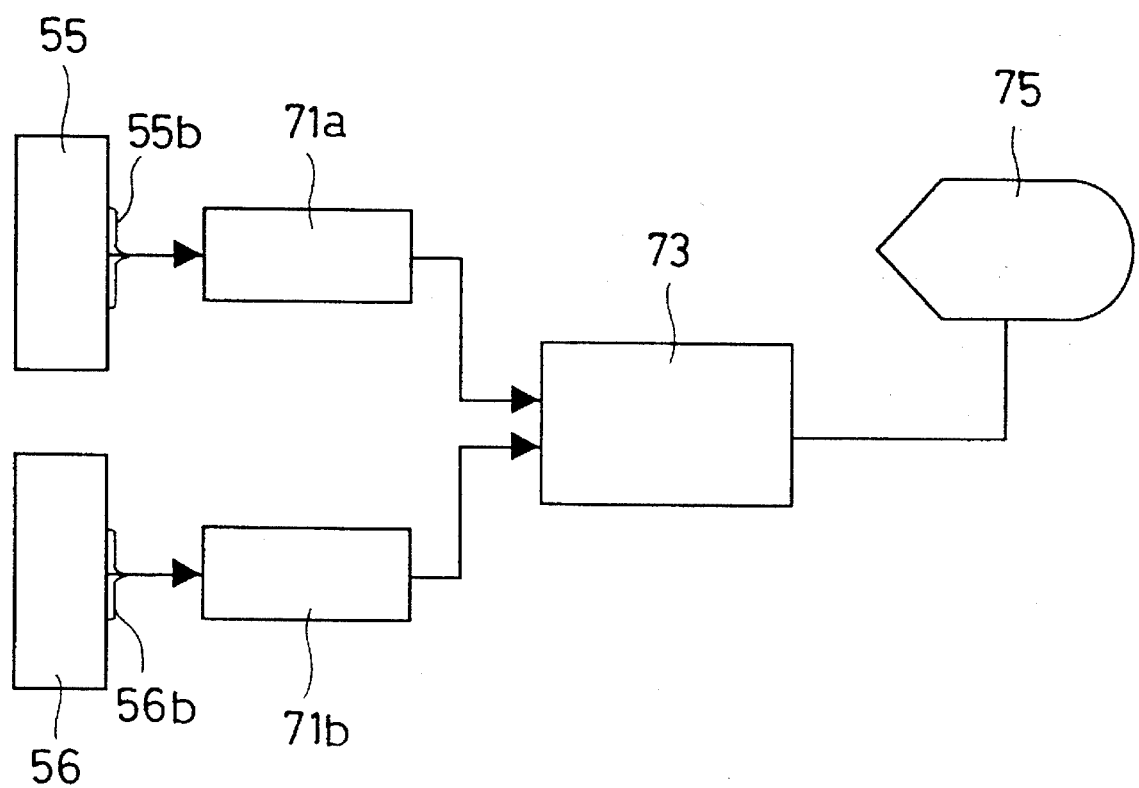

In the assembling process, according to the present invention, a predetermined checking chart image is formed on the CCD image sensors 55 and 56. The checking chart image is output to the image processing circuits 71a and 71b through the terminal pins 55b and 56b as the electrical image signals, which have been optically transformed by the CCD image sensors 55 and 56, and are then subject to signal processing by the image processing circuits 71a and 71b. Thereafter, the image signals are combined by the image control circuit 73 and are indicated on the monitor 75 (FIG. 23). The operator carries out the following adjustment of positions of the image sensors 55 and 56, while looking at the display of the monitor 75.

The CCD image sensor securing portions 60 and 61 have first and second holding surfaces 60a and 61a opposed to the outer surfaces 55c and 56c of the CCD image sensors 55 and 56 to movably guide the latter in the directions of the optical axes O, and O2, respectively. The CCD image sensors 55 and 56 are movably guided in the direction of the Z-axis (FIG. 18), perpendicular to the emitting surfaces 57a and 58a, when the terminal pins 55b and 56b are located on the top and bottom sides and the light receiving surfaces 55a and 56 are parallel with the emitting surfaces 57a and 58a. The holding surfaces 60a and 61a are connected to the bottom surfaces 60b and 61b, respectively. The holding surfaces 60a and 61a are provided with guide grooves 60c and 61c, which guide an adhesive in the upward and downward directions of the right and left outer surfaces 55c and 56c (i.e., parallel to the light receiving surfaces) when the image pickup elements 55 and 56 are placed between the respective holding surfaces 60a and 61a.

Figure 21:
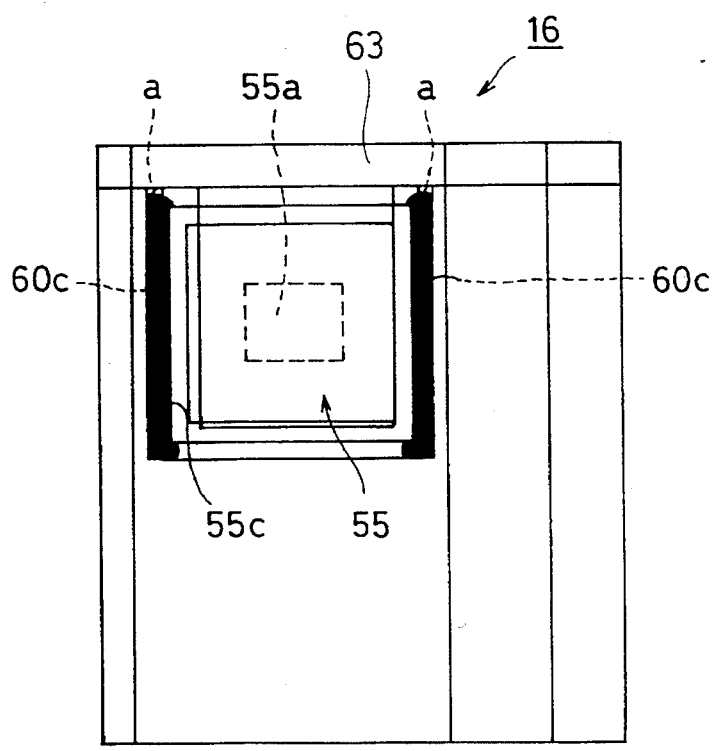
FIG. 21 is a view of an image sensor securing apparatus, as shown in FIG. 19, viewed from the side of a first CCD image sensor.
Figure 22:
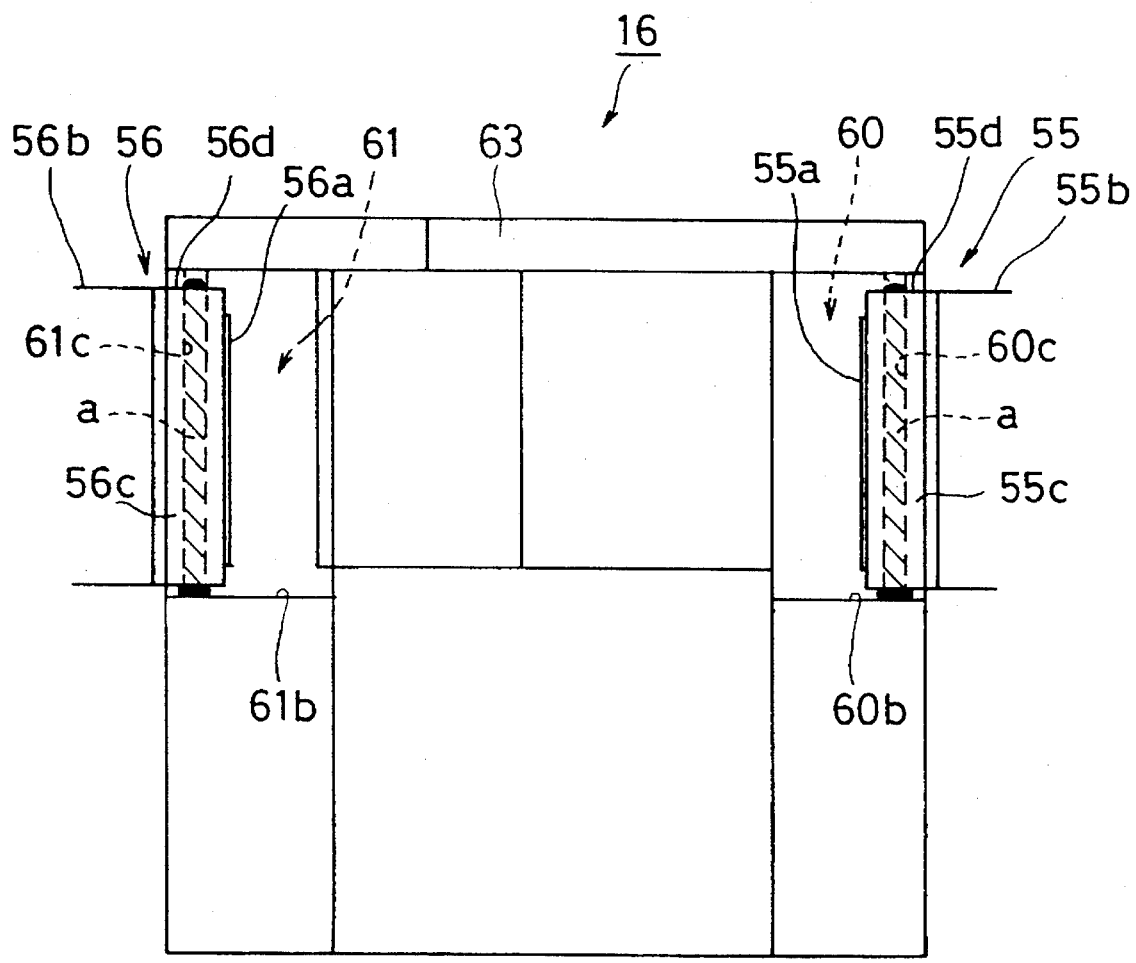
FIG. 22 is a view of an image sensor securing apparatus, as shown in FIG. 19, viewed from the side of a lens assembly; and, FIG. 23 is a block diagram of an electric circuit of a picture taking system of an electronic camera according to the present invention.

The respective holding surfaces 60a and 61a are spaced from one another at a distance such that when the image pickup elements 55 and 56 are placed therebetween, there are slight gaps between the holding surfaces 60a, 61a and the corresponding outer surfaces 55c and 56c of the image pickup devices 55 and 56. The image sensor securing portions 60 and 61 have open upper ends. Consequently, the gaps mentioned above, the spaces above the image pickup devices 55 and 56 defined by the open ends of the image sensor securing portions 60 and 61, and the gaps between the light receiving surfaces 55a and 56a, and the light emitting surfaces 57a and 58a, permit the first and second image sensors 55 and 56 to slightly move and rotate within the CCD securing portions 60 and 61 in and about the directions of the Z-axis, the X-axis perpendicular to the Z-axis and parallel with the optical axis O, and the Y-axis perpendicular to the X-axis and the Z-axis and extending in the vertical direction. Thus, the fine adjustment can be carried out (FIG. 18). The spaces above the upper ends of the image pickup devices 55 and 56 are closed by the guide plate 63 after the adjustment is completed (FIGS. 21 and 22).

The attachment of the first and second CCD image sensors 55 and 56 to the prism portion 16, for example upon manufacturing of the camera, will be described below.

First, the holder H is attached to the substrate 12 before the first and second CCD image sensors 55 and 56 are attached to the holder H. Thereafter, one of the first and second CCD image sensors 55 and 56, for example, the first CCD image sensor 55 is attached to the holder H. Upon attachment, the right and left side surfaces 55c are inserted between the right and left image sensor holding surfaces 60a of the corresponding CCD securing portion (i.e., first CCD securing portion) 60, with the upper and lower surfaces 55d of the first CCD image sensor 55 facing up and down. As mentioned above, there are slight gaps between the right and left side surfaces 55c of the first CCD image sensor 55 and the corresponding right and left image sensor holding surfaces 60a. The slight gaps ensure a smooth insertion of the first CCD image sensor 55 between the image sensor holding surfaces 60a. If necessary, it is possible to hold the first CCD image sensor 55 by a manual holding tool or a vacuum device, etc., during the insertion. Alternatively, it is possible to use an automatic manipulator, such as a robot hand.

Note that during the following operations, the substrate 12 is immovably held at a vertical posture in which the guide grooves 60c and 61c extend in the vertical direction, by a clamping device or the like provided along a manufacturing line or inspection line.

Consequently, the right and left side surfaces 55c are opposed to the corresponding guide grooves 60c. In this state, the first CCD image sensor 55 is slightly rotated or moved in the X, Y, and/or Z directions, so that the optical axis O (i.e., spot image on the optical axis) is located at the center of the light receiving surface 55a which is normal to the optical axis O, (Z-axis) and which is located at the focal point. In this position, the right and left side surfaces 55c of the first CCD image sensor 55 cover the corresponding right and left guide grooves 60c.

Thereafter, an adhesive "a" is introduced into the guide grooves 60c. Consequently, when the adhesive is set, the right and left side surfaces 55c are adhered to the corresponding holding surfaces 60a. Thus, the first CCD image sensor 55 is secured to the CCD securing portion 60.

Thereafter, the second CCD image sensor 56 is inserted between the corresponding holding surfaces 61a of the second CCD securing portion 61, similar to the first CCD image sensor 55. In this state, inspecting chart light is made incident through the lens assemblies L1, L2 and L3 from the object side, and converged onto the first and second CCD image sensors 55 and 56. The second CCD image sensor 56 is slightly rotated or moved in the X, Y, and/or Z directions in accordance with the image data of the first CCD image sensor 55, so that the image of the second CCD image sensor is correctly superimposed on the image of the first CCD image sensor 55 to form a clear object image.

After the positioning of the second CCD image sensor 56 is completed, the adhesive "a" is poured in the right and left guide grooves 61c. When the adhesive is set, the right and left side surfaces 56c are adhered to the corresponding holding surfaces 61a. Thus, the second CCD image sensor 56 is secured to the second CCD securing portion 61.

As can be seen from the above discussion, the first and second CCD image sensors 55 and 56 are directly adhered to the image sensor securing portions 60 and 61. Accordingly, no additional adaptor is necessary to incorporate or attach the first and second CCD image sensors 55 and 56, resulting in a simple assembly procedure. Also, this reduces the number of components and simplifies the structure of the apparatus.

An adhesive "a" that can be used, for example, is epoxy resin. Preferably, the thermosetting adhesive to be used has a smooth flowing characteristic, a small thermal expansion rate, and exhibits little change in volume before and after setting.

Although the above discussion has been directed to a camera having two image pickup devices, the present invention can be applied to a camera having a single image pickup device or more than two image pickup devices.

According to the present invention, since the image pickup devices are adhered to the image sensor holding surfaces which are provided with guide grooves opposed to the image pickup devices by an adhesive introduced into the guide grooves, the CCD image sensors can be easily and directly secured without using an additional adaptor. Consequently, not only can the number of the components of the apparatus be reduced, but also the structure and assembling operation of the apparatus can be simplified.

I claim:

1. An apparatus for adjusting an intermeshing angle of a pin and a feed screw in a mechanism in which rotational movement of said feed screw is converted to a linear movement of said pin, comprising:

at least one pin which is in engagement with said feed screw; and, a linearly movable member which supports said pin and which moves in an axial direction of said feed screw, wherein said linearly movable member includes an adjusting means for adjusting the intermeshing angle of said pin and said feed screw.

2. The adjusting apparatus of claim 1, wherein said adjusting means includes an adjusting screw that is rotated about an axis of rotation of said adjusting means to vary the intermeshing angle of said pin and said feed screw.

3. The adjusting apparatus of claim 2, wherein said pin is perpendicular to the axis of rotation of said adjusting means, and wherein the axis of rotation of said adjusting means passes through the axial direction of said feed screw.

4. The adjusting apparatus of claim 3, wherein said adjusting means further includes a pin securing member to which opposite ends of said pin are secured.

5. The adjusting apparatus of claim 4, wherein said linearly movable member includes a pin support which rotatably supports said pin securing member.

6. The adjusting apparatus of claim 5, further comprising:

a means for biasing said pin against said feed screw in a direction perpendicular to said feed screw.

7. The adjusting apparatus of claim 6, wherein said pin support comprises said biasing means.

8. A lens driving apparatus for moving at least one lens group in an optical axis direction to effect zooming and/or focusing by means of an apparatus for adjusting an intermeshing angle of a pin and a feed screw in a mechanism in which rotational movement of said feed screw is converted to a linear movement of said pin, comprising:

at least one pin which is in engagement with said feed screw; and, a linearly movable member, which is connected to said at least one lens group, supports said pin, and moves in an axial direction of said feed screw, wherein said linearly movable member includes an adjusting means for adjusting the intermeshing angle of said pin and said feed screw.

9. A lens driving apparatus in which rotational movement of a feed screw is converted to linear movement of at least one pair of lens assemblies in an optical axis direction, said apparatus comprising:

a pair of feed screw shafts which are independently rotatable, wherein axes of said feed screw shafts are coaxially aligned in a predetermined direction; and a pair of driving means for independently driving said respective feed screw shafts, at least one of said pair of driving means spaced from said predetermined direction.

10. The lens driving apparatus of claim 9, wherein at least one of said feed screw shafts is hollow.

11. The lens driving apparatus of claim 10, further comprising:

a single core shaft which is inserted in both said feed screw shafts.

12. The lens driving apparatus of claim 11, wherein one of said feed screw shafts is secured to said core shaft and another feed screw shaft is rotatable with respect to an axis of said core shaft.

13. The lens driving apparatus of claim 12, wherein said core shaft is provided on an end thereof that projects from said other feed screw shaft with a first gear and said feed screw shaft is provided with a second gear in a vicinity of said first gear.

14. The lens driving apparatus of claim 13, wherein said two driving means comprise gears which are in engagement with said first and said second gears.

15. The lens driving apparatus of claim 9, wherein one of said feed screw shafts is a hollow shaft, and another feed screw shaft is provided with a core shaft which is inserted in said hollow shaft.

16. The lens driving apparatus of claim 9, wherein said two driving means are located in a symmetrical arrangement with respect to an axis of said feed screw.

17. The lens driving apparatus according to claim 9, further comprising means for mounting said shafts and enabling relative rotation between said shafts.

18. The lens driving apparatus according to claim 9, said pair of driving means being symmetrically arranged with respect to said predetermined direction.

19. A lens driving apparatus in which rotational movement of a feed screw is converted to linear movement of at least one pair of lens assemblies in an optical axis direction to effect zooming and/or focusing, said apparatus comprising:

a pair of feed screw shafts which are independently rotatable, wherein axes of said feed screw shafts are coaxially aligned in a predetermined direction;

means for mounting said shafts and enabling relative rotation between said shafts; and a pair of driving means for independently driving said respective feed screw shafts.

20. The lens driving apparatus according to claim 19, at least one of said feed screw shafts being hollow.

* * * * *